United States Patent
Desing et al.

(10) Patent No.: US 10,975,954 B2
(45) Date of Patent: Apr. 13, 2021

(54) PISTON APPARATUS FOR USE WITH VEHICLE CLUTCHES

(71) Applicant: JTEKT AUTOMOTIVE NORTH AMERICA, INC., Plymouth, MI (US)

(72) Inventors: Patrick Desing, Simpsonville, SC (US); Shun Ono, Novi, MI (US); Evan Swinger, Plymouth, MI (US); Sean Hayes, Plymouth, MI (US)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 68 days.

(21) Appl. No.: 16/412,781

(22) Filed: May 15, 2019

(65) Prior Publication Data
US 2020/0362924 A1 Nov. 19, 2020

(51) Int. Cl.
  *F16H 57/04* (2010.01)
  *F16H 48/22* (2006.01)
  *F16H 48/06* (2006.01)
  *F16D 25/12* (2006.01)
  *F16D 48/06* (2006.01)
  *F16D 25/08* (2006.01)
  *F16D 121/04* (2012.01)

(52) U.S. Cl.
  CPC ....... *F16H 57/0424* (2013.01); *F16D 25/083* (2013.01); *F16D 48/062* (2013.01); *F16H 48/22* (2013.01); *F16D 25/123* (2013.01); *F16D 2121/04* (2013.01); *F16H 57/0473* (2013.01)

(58) Field of Classification Search
  CPC .. F16D 48/062; F16D 2121/04; F16D 25/083; F16D 13/74; F16D 25/123; F16D 2048/0218; F16D 2048/0224; F16D 2021/0692; F16D 2021/0607; F16D 21/06; F16D 2021/0661; F16H 57/0424; F16H 48/22; F16H 48/19; F16H 57/0473
  See application file for complete search history.

(56) References Cited

U.S. PATENT DOCUMENTS 9,902,263 B2 * 2/2018 Pump ................. B60K 23/0808
2009/0277711 A1 * 11/2009 Hoffmann .......... B60K 23/0808
                                                                180/247

(Continued)

FOREIGN PATENT DOCUMENTS

| JP | 58-150650 U | 10/1983 |
| JP | 2013-253615 A | 12/2013 |
| WO | 2013/045444 A1 | 4/2013 |

*Primary Examiner* — Mark A Manley
(74) *Attorney, Agent, or Firm* — Oblon, McClelland, Maier & Neustadt, L.L.P.

(57) ABSTRACT

Piston apparatus for use with vehicle clutches are disclosed. A disclosed drive unit assembly for a vehicle includes a housing defining a first cavity and a second cavity fluidly coupled together. The drive unit assembly also includes a clutch positioned in the first cavity. Rotation of the clutch conveys a fluid from the first cavity to the second cavity. The drive unit assembly also includes a port extending from the second cavity to the first cavity to receive the fluid. The drive unit assembly also includes a piston positioned in the first cavity proximate to the port and configured to operate the clutch. Movement of the piston relative to the port controls a flow of the fluid through the port from the second cavity to the first cavity.

19 Claims, 14 Drawing Sheets

(56) References Cited

U.S. PATENT DOCUMENTS

| | | | | |
|---|---|---|---|---|
| 2012/0031727 A1* | 2/2012 | Nett | .................... | F16H 57/0457 |
| | | | | 192/113.1 |
| 2014/0231209 A1* | 8/2014 | Nett | .................... | F16H 57/0483 |
| | | | | 192/85.01 |
| 2014/0284168 A1* | 9/2014 | Niwata | ................. | F16D 25/083 |
| | | | | 192/85.61 |
| 2017/0363196 A1* | 12/2017 | Hosokawa | ............ | F16D 13/646 |

* cited by examiner

PISTON APPARATUS FOR USE WITH VEHICLE CLUTCHES

FIELD OF THE DISCLOSURE

This disclosure relates generally to vehicles and, more particularly, to piston apparatus for use with vehicle clutches.

BACKGROUND

Motor vehicles typically employ clutch systems to facilitate transferring torque from an engine to a vehicle driveshaft and/or one or more vehicle axles. Some vehicle clutch systems utilize fluids (sometimes referred to as wet clutches) such as oil for moving components (e.g., a clutch pack) of a clutch to cool and/or lubricate the components, which improves clutch performance and/or increases a lifespan of the clutch. Typically, the clutch is immersed in an oil bath within a sealed cavity of a housing.

SUMMARY

An example drive unit assembly for a vehicle includes a housing defining a first cavity and a second cavity fluidly coupled together. The drive unit assembly also includes a clutch positioned in the first cavity. Rotation of the clutch conveys a fluid from the first cavity to the second cavity. The drive unit assembly also includes a port extending from the second cavity to the first cavity to receive the fluid. The drive unit assembly also includes a piston positioned in the first cavity proximate to the port and configured to operate the clutch. Movement of the piston relative to the port controls a flow of the fluid through the port from the second cavity to the first cavity.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
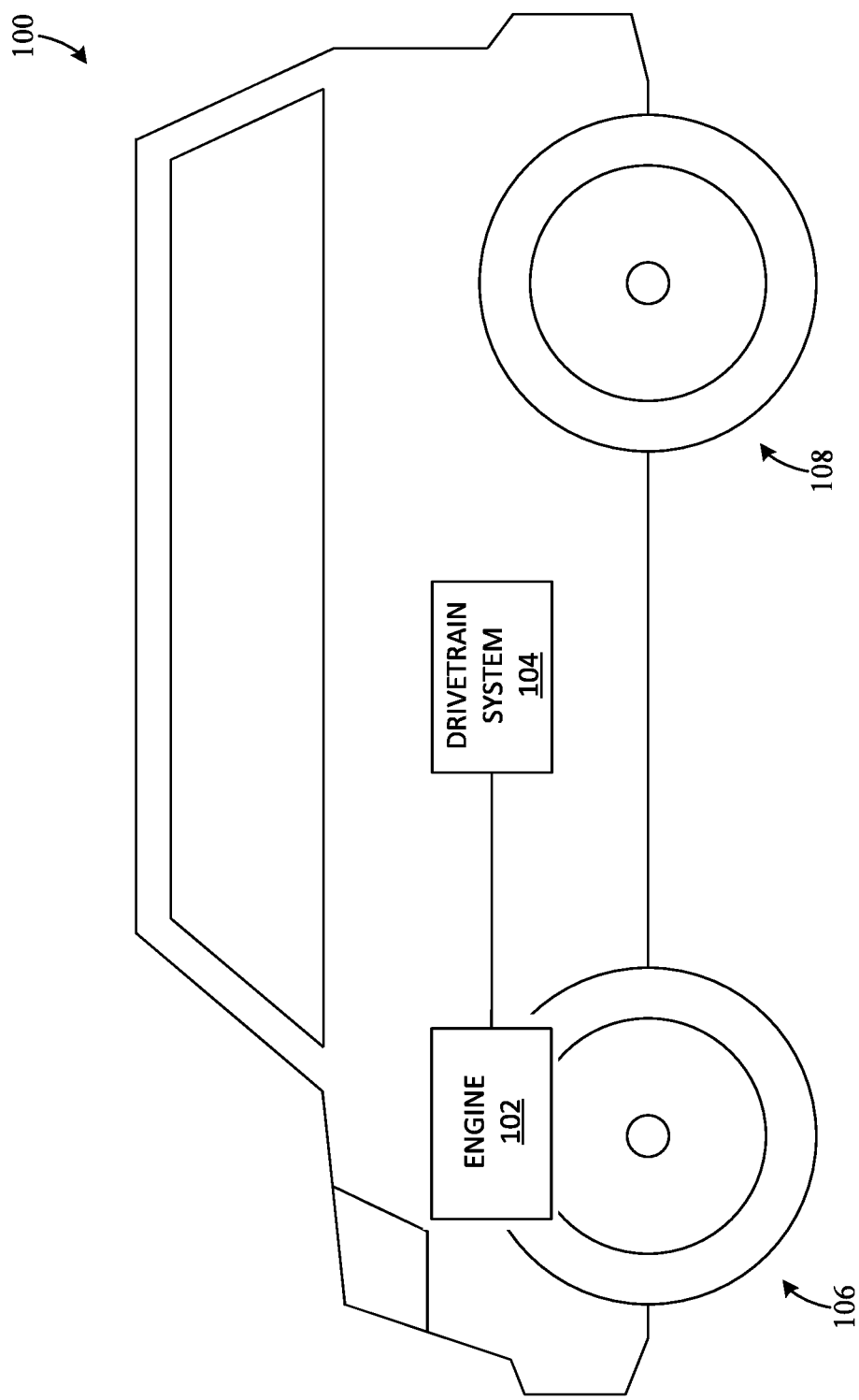
FIG. 1 is a view of an example vehicle in which examples disclosed herein can be implemented.

Some known rear drive module or unit (RDU) systems enable a vehicle to change between two-wheel drive and four-wheel drive functionality, which improves vehicle performance and/or handling in certain driving conditions. A known RDU system may be operatively coupled between a propeller shaft and a rear axle of the vehicle and configured to transfer torque therebetween based on interaction between plates of a clutch. To shift to a connected state such that the clutch is engaged, these known RDU systems may include a hydraulic actuator operatively coupled to the clutch that actuates to squeeze inner and outer clutch plates together, thereby generating torque for the rear axle and/or rear road wheels of the vehicle. Such known RDU systems may be implemented as a permanent active on demand (AOD) system as well as a disconnecting system where a ring gear and pinion in a housing are stopped when four-wheel drive functionality is not needed. For such disconnecting systems, the hydraulic actuator has to provide sufficient clearance (i.e., the hydraulic actuator is sufficiently spaced from clutch plates) when the system is disconnected to prevent excessive energy loss due to friction experienced by the clutch plates.

Additionally, such known RDU systems may utilize oil that is contained in sealed clutch and gear cavities of the housing within which the clutch and the ring gear are positioned. However, when in two-wheel drive (i.e., the clutch is not engaged), the oil adversely affects vehicle fuel economy by increasing fluid drag on clutch plates and/or other moving components associated therewith. To prevent this undesired energy loss due to the oil, some known RDU systems are configured to evacuate the oil from the clutch cavity when the vehicle is in two-wheel drive and circulate the oil between the clutch and gear cavities when the vehicle is in four-wheel drive. In particular, these known RDU systems fluidly couple the clutch and gear cavities together via one or more fluid lines or oil paths such that the oil can be conveyed between the cavities in response to rotation of the clutch and gear. For example, when driving in two-wheel drive, rotation of the clutch (e.g., caused by road wheels of vehicle) causes the oil to evacuate from the clutch cavity and fill the gear cavity, which leaves the clutch improperly lubricated.

These known RDU systems are also configured to provide or flow the oil back into the clutch cavity when the vehicle is in four-wheel drive (i.e., the clutch is engaged) to reduce a temperature of the clutch plates, improve thermal capacity of the clutch plates, and/or otherwise properly lubricate the clutch. For example, rotation of the ring gear pumps the oil back into the clutch cavity. However, for high torque applications of the clutch when transitioning from two-wheel drive to four-wheel drive, the hydraulic actuator actuates relatively quickly before a sufficient amount of the oil is provided to the clutch cavity. In particular, these known RDU systems flow the oil back into the clutch cavity at a relatively low flow rate that relies on a rate of rotation of the gear and/or a long oil path extending from the gear cavity to the clutch cavity. Thus, when shifting to a connected state such that the clutch re-engages, these known RDU systems take a relatively long time to fill the clutch cavity with the oil, which leaves the clutch insufficiently and/or improperly lubricated for a substantial time interval during clutch operation. As a result, these known RDU systems cause the clutch and/or moving components associated therewith to rapidly wear and/or degrade.

Piston apparatus for use with vehicle clutches are disclosed. Examples disclosed herein provide an example drive unit (e.g., an RDU) assembly for a vehicle that is structured and/or configured to enable the vehicle to change or shift between two-wheel drive and four wheel drive functionality. The disclosed drive unit assembly includes an example clutch (e.g., friction clutch such as a multi-plate clutch) that is operatively coupled to a housing and configured to control a transfer of torque between a driveshaft (e.g., a propeller shaft) and one or more axles (e.g., rear axle(s)) and/or one or more road wheels of the vehicle. The disclosed clutch is positioned in a first cavity (e.g., a clutch cavity) formed by the housing that receives a fluid (e.g., oil) to improve clutch performance and/or part life when the clutch is engaged. In particular, disclosed examples enable the fluid to substantially evacuate the first cavity when the clutch is disengaged (i.e., when the vehicle is in two-wheel drive), which improves vehicle fuel economy by reducing and/or eliminating fluid drag experienced by plates of the clutch. Further, when the clutch re-engages (i.e., when the vehicle changes or shifts from two-wheel drive to four-wheel drive), disclosed examples rapidly fill the first cavity with the fluid to properly and/or immediately lubricate the clutch, which reduces and/or prevents damage to the clutch that would have otherwise been caused by the above mentioned known RDU systems during such a transition of the vehicle from two-wheel drive to four-wheel drive.

To direct the fluid out of the first cavity, the disclosed drive unit assembly includes a first fluid channel that is fluidly coupled to the first cavity to convey the fluid in response to rotation of the clutch. For example, as a housing (e.g., a drum) of the clutch rotates, the fluid is urged radially outward relative to an axis of the clutch and into an inlet of the first channel. The first fluid channel extends away from the first cavity to provide, via an outlet of the first fluid channel, the fluid to a second cavity (e.g., a gear cavity and/or a fluid reservoir) formed by the housing that is separate from the first cavity to store the fluid and/or lubricate a gear (e.g., a ring gear or crown wheel) positioned in the second cavity and interposed between the clutch and the driveshaft. In this manner, when the driveshaft causes the clutch housing to rotate, the fluid flows through the first channel at a particular flow rate from the first cavity to the second cavity based on one or more parameters (e.g., a rate of rotation, a size, a shape, etc.) of the clutch component(s) and/or one or more parameters (e.g., a cross-sectional area, a length, etc.) of the first channel. In particular, when operating the vehicle in four-wheel drive, one or more of these parameters are configured such that the flow rate at which the fluid flows out of the first cavity is greater than a flow rate at which the fluid flows into the first cavity until a steady state fluid level within the first cavity is reached. As a result, the fluid empties from the first cavity and fills the second cavity and/or a first catch tank coupled to the housing interposed between the inlet and outlet of the first fluid channel. In some examples, the first fluid channel is provided with the first catch tank to further store the fluid and/or control the flow rate at which the fluid is provided to the second cavity.

To rapidly and/or sufficiently direct the fluid out of the second cavity and into the first cavity, the disclosed drive unit assembly includes an example port that is positioned on an internal wall of the housing and extends from the second cavity to the first cavity and/or otherwise fluidly couples the cavities together. The disclosed port is positioned below a surface of the fluid (e.g., a steady state fluid level) in the second cavity at a particular depth, which allows gravity and/or fluid pressure to urge the fluid through the port from the second cavity to the first cavity. In particular, the drive unit assembly includes an example piston (sometimes referred to as an active piston) configured operate the clutch and control a flow of the fluid through the port from the second cavity to the first cavity. The disclosed piston includes a fluid flow control portion (e.g., a flange) that blocks or seals the port when the clutch is disengaged, thereby preventing the fluid from flowing through the port. As such, the fluid accumulates in the second cavity when the clutch is disengaged.

As the disclosed piston actuates or strokes (e.g., via a hydraulic fluid pressure provided to the piston by a fluid supply system) to engage the clutch plates and/or change the state of the clutch, the fluid flow control portion of the piston moves away from and/or unblocks or unseals the port, thereby enabling the fluid to flow through the port at a relatively fast flow rate from the second cavity to the first cavity. This flow rate may be based on one or more parameters associated with the port such as, for example, one or more of a size of the port, a shape of the port, the depth of the port beneath the surface of the fluid, a distance by which the piston portion is spaced from the port, etc. Accordingly, one or more of these parameters associated with the port are configured to ensure the fluid is sufficiently provided to the first cavity and/or the clutch when the piston moves. As a result, disclosed examples enable the fluid to rapidly reach the clutch and/or the components thereof when the vehicle begins to shift or change from two-wheel drive to four-wheel drive (i.e., from a disconnected state of the drive unit assembly to a connected state of the drive unit assembly), which would have otherwise been unattainable using the above mentioned known RDU systems that rely on rotating components to pump the fluid. This disclosed manner of fluid control allows the clutch plates to generate an increased (e.g., a maximum) amount or degree of torque for the clutch without any adverse part wear that would have otherwise occurred due to improper clutch lubrication. Further, the disclosed piston does not require any additional power source(s) (e.g., a motor or pump) than what is typically required for clutch activation.

To facilitate circulating the fluid through the drive unit assembly during four-wheel drive operation (e.g., after transitioning from two-wheel drive to four-wheel drive), some disclosed examples provide a second example fluid channel, different from the first fluid channel, that is fluidly coupled to the second cavity to convey the fluid in response to rotation of the gear. For example, as the gear rotates, the fluid is urged radially outward relative to an axis of the gear and into an inlet of the second channel. The second channel extends away from the second cavity to provide, via one or more outlets of the second channel, the fluid to the first cavity and/or the clutch, which lubricates components of the clutch and/or bearings in the housing. In this manner, the fluid flows through the second channel at a particular flow rate from the second cavity to the first cavity based on one or more parameters (e.g., a rate of rotation, a size, a shape, etc.) of the gear and/or one or more parameters (e.g., a cross-sectional area, a length, etc.) of the second channel. Accordingly, one or more of these parameters are configured to provide sufficient fluid circulation for the drive unit assembly. In some examples, the second fluid channel is provided with a second fluid reservoir (e.g., a catch tank coupled to the housing) interposed between the inlet and the outlet(s) to store the fluid and/or control a flow rate at which the fluid is provided to the first cavity and/or the clutch.

FIG. 1 is a view of an example vehicle (e.g., a car, a truck, a sport utility vehicle (SUV), etc.) 100 in which examples disclosed herein can be implemented. According to the illustrated example of FIG. 1, the vehicle 100 includes an example engine (e.g., an internal combustion engine) 102, an example drivetrain system 104, and one or more examples wheels 106, 108 (sometimes referred to as road wheels), two of which are shown in this examples, (i.e., a first or front wheel 106 and a second or rear wheel 108). The drivetrain system 104 of FIG. 1 is structured and/or configured to transfer torque from the engine 102 to the wheel(s) 106, 108 to cause the vehicle 100 to move, for example, via one or more driveshafts, one or more clutches, one or more axles, etc., as discussed further below. For example, the engine 102 generates a torque (sometimes referred to as an engine torque) and, in response, the drivetrain system 104 controls an amount or degree of the torque provided to the wheel(s) 106, 108.

In particular, the drivetrain system 104 of FIG. 1 enables the vehicle 100 to change between a first driving mode (e.g., two-wheel drive) that is associated with a first driving characteristic of the vehicle 100 and a second driving mode (e.g., four-wheel or all-wheel drive) that is associated with a second driving characteristic of the vehicle 100 different from the first driving characteristic. For example, a controller (e.g., an electronic control unit (ECU)) of the vehicle 100 transmits power and/or control signal(s) or command(s) to an actuator system that is associated with the drivetrain system 104 and operatively coupled to a clutch such as, for example, the actuator system 208 of FIGS. 2 and 3. In response, the actuator system causes the clutch to change between a disengaged state and an engaged sate, thereby providing the respective first and second driving modes of the vehicle 100. In such examples, when the vehicle 100 is operating in the first driving mode, the drivetrain system 104 transfers output from the engine 102 to only the front wheel(s) 106 or the rear wheel(s) 108. However, when the vehicle 100 is operating in the second driving mode, the drivetrain system 104 transfers the output from the engine 102 to all of the front and rear wheels 106, 108.

In some examples, the vehicle 100 includes one or more input devices (e.g., a shifter stick or knob, a button, a switch, etc.) to enable a user (e.g., a driver) to select the first or second driving mode of the vehicle 100 in response to the user interacting with and/or providing input(s) to the input device(s). For example, the input device(s) are communicatively coupled (e.g., via one or more of a transmission or signal wire, a bus (e.g., a controller area network (CAN)), radio frequency, etc.) to the controller to provide associated user data to the controller and/or otherwise cause the controller to control the drivetrain system 104 in accordance with the input(s).

Figure 2:
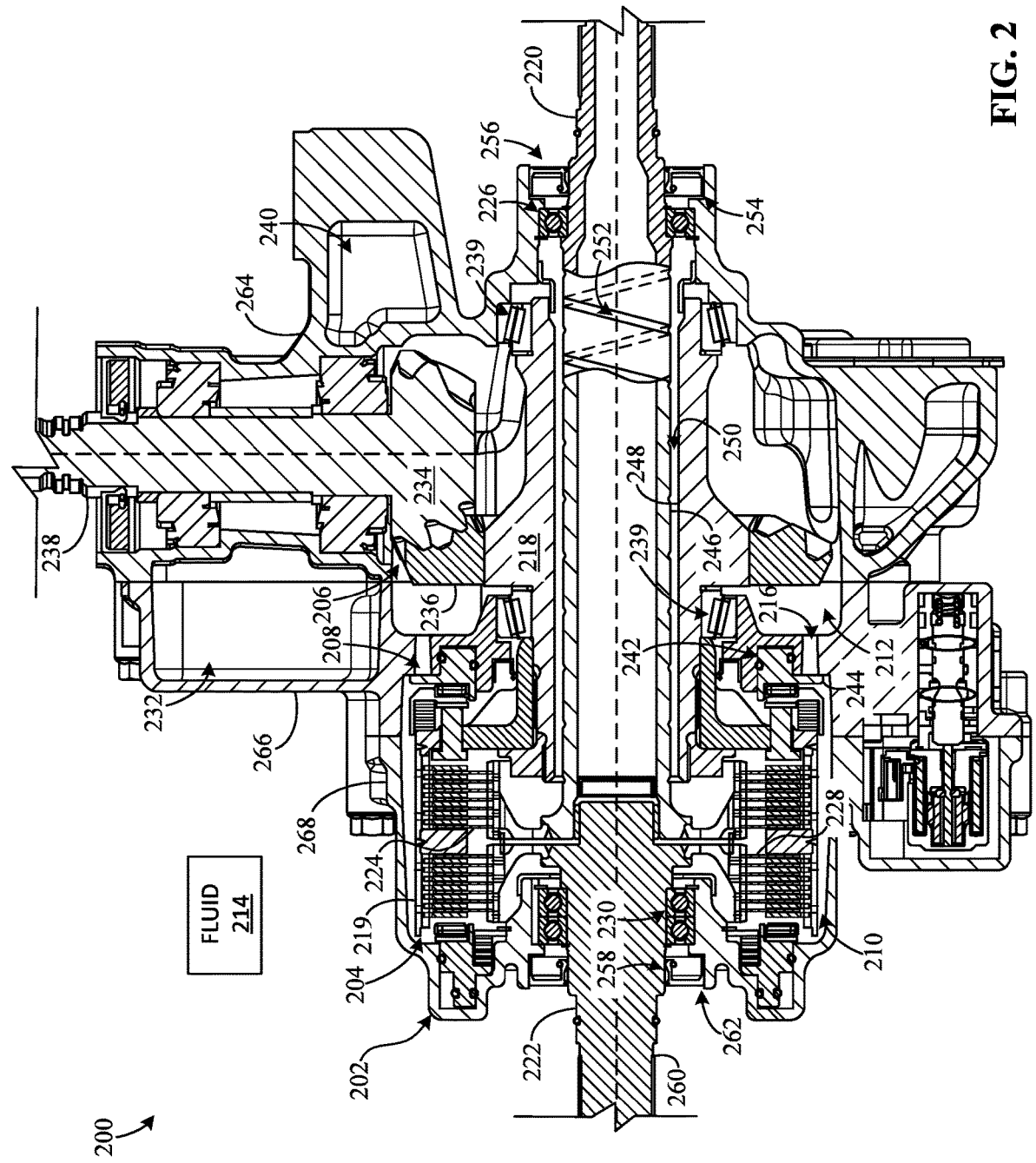
FIG. 2 is a cross-sectional view of an example drive unit assembly and shows a first example configuration thereof in accordance with the teachings of this disclosure.

FIG. 2 is a cross-sectional view of an example drive unit assembly (e.g., an RDU) 200 and shows a first example configuration thereof in accordance with the teachings of this disclosure. In some examples, the drive unit assembly 200 of FIG. 2 is used to implement at least a portion of the drivetrain system 104 of FIG. 1. The drive unit assembly 200 of FIG. 2 includes an example housing 202, an example clutch 204, an example gear system 206, and an example actuator system 208. As shown in FIG. 2, the clutch 204 is positioned in a first example cavity 210 (sometimes referred to as a clutch cavity) formed and/or defined by the housing 202. The housing 202 of FIG. 2 also forms and/or defines a second example cavity 212 (sometimes referred to as a fluid reservoir and/or a gear cavity) separate from the first cavity 210. The first cavity 210 and the second cavity 212 are in fluid communication (e.g., via one or more fluid supply lines, one or more fluid channels, etc.) with each other and receive a first example fluid (e.g., oil) 214 for lubricating and/or cooling one or more components of the drive unit assembly 200. In particular, the actuator system 208 is structured and/or configured to control, via a first example port 216 (sometimes referred to as a crossover port) extending through the first housing 202, a flow of the first fluid 214 from the second cavity 212 to the first cavity 210 as the vehicle 100 changes from the first driving mode to the second driving mode and/or as the clutch 204 changes from a disengaged state to an engaged state, as discussed further below in connection with FIGS. 3-14.

The clutch 204 of FIG. 2 is operatively coupled to the first housing 202 and configured to control an amount or degree of torque transferred from the engine 102 to one or more of the wheels 106, 108 based on the state of the clutch 204. For example, the clutch 204 of FIG. 2 receives the engine torque from the gear system 206 via a first shaft 218 coupled to and extending between a second example housing (e.g., a drum) 219 of the clutch 204 and a portion of the gear system 206. In particular, when the clutch 204 is in the engaged state and/or at least partially engaged, the clutch 204 transfers at least a portion of the engine torque from the engine 102 to one or more example shafts or axles 220, 222 (sometimes referred to as output shafts) extending through and/or out of the first housing 202, two of which are shown in this example (i.e., a first axle 220 and a second axle 222). The clutch 204 of FIG. 2 may be implemented, for example, using a friction based clutch such as a multi-plate clutch. However, in some examples, the clutch 204 may be implemented differently. In some examples, the clutch 204 includes and/or is implemented using a twin or dual clutch, as shown in FIG. 2. Additionally or alternatively, in some examples, the clutch 204 includes and/or is implemented using a single clutch, as discussed further below in connection with FIGS. 8-12.

The first axle 220 of FIG. 2 is coupled to one or more first example inner discs or plates (e.g., annular plates) 224 (seven of which are shown in this example) of the clutch 204 and one of the wheels 106, 108. That is, the clutch 204 of FIG. 2 includes the first inner plate(s) 224. As such, when the clutch 204 is at least partially engaged during vehicle operation, the engine torque causes the first axle 220, the first inner plate(s) 224, and the one of the wheels 106, 108 to rotate cooperatively. Additionally, the first axle 220 is rotatably coupled to the first housing 202, for example, via one or more example bearings (e.g., one or more ball bearings) 226 operatively coupled to and/or interposed between the first axle 220 and a portion of the first housing 202, one of which is shown in this example. Further, the second axle 222 of FIG. 2 is coupled to one or more second example inner discs or plates (e.g., annular plates) 228 (seven of which are shown in this example) of the clutch 204, different from the first inner plate(s) 224, and the other one of the wheels 106, 108. As such, when the clutch 204 is at least partially engaged, the engine torque causes the second axle 222, the second inner plate(s) 228, and the other one of the wheels 106, 108 to rotate cooperatively. Additionally, the second axle 222 is rotatably coupled to the first housing 202, for example, via one or more example bearings (e.g., one or more ball bearings) 230 operatively coupled to and/or interposed between second axle 222 and a portion of the first housing 202, two of which are shown in this example.

According to the illustrated example of FIG. 2, in response to at least a portion (e.g., the second housing 219) of the clutch 204 rotating, the first fluid 214 flows from the first cavity 210 to the second cavity 212, for example, via a first example fluid channel 402 (shown in FIG. 4) extending from the first cavity 210 to the second cavity 212, as discussed further below in connection with FIG. 4. That is, in some examples, the clutch 204 pumps the first fluid 214 out of the first cavity 210 and into the second cavity 212. Additionally, in some such examples, to store the first fluid 214 and/or facilitate controlling a flow of the first fluid 214 into the second cavity 212, the drive unit assembly 200 includes a first example fluid reservoir (e.g., a tank or a cavity formed and/or defined by the first housing 202) 232 fluidly coupled between the first cavity 210 and the second cavity 212.

The gear system 206 of FIG. 2 is operatively interposed between the clutch 204 and the engine 102 to transfer torque therebetween. For example, the gear system 206 includes a first example gear (e.g., a pinion gear) 234 meshed with and/or operatively coupled to a second example gear (e.g., a ring gear) 236. The first gear 234 of FIG. 2 is coupled to a second example shaft (e.g., a propeller shaft) 238, for example, via one or more example fasteners and/or more example fastening methods or techniques. That is, the drive unit assembly 200 includes the second shaft 238, which extends through and/or out of the first housing 202, for example, to connect to one or more components of the drivetrain system 104 and/or otherwise receive the engine torque during vehicle operation. In some examples, to stabilize and/or facilitate rotational movement of the first gear 234 and/or second shaft 238, the second shaft 238 is rotatably coupled to a portion of the first housing 202, for example, via one or more example bearings operatively coupled to and/or interposed between the second shaft 238 and a portion of the first housing 202. The second gear 236 of FIG. 2 is coupled to the first shaft 218 associated with the second housing 219 of the clutch 204, for example, via one or more example fasteners and/or one or more example fastening methods or techniques. As a result, in some examples, when the second shaft 238 receives the torque from the engine 102, the second shaft 238, the first gear 234, the second gear 236, the first shaft 218, and the second housing 219 rotate cooperatively. In some examples, to maintain a proper position and/or orientation of the second gear 236 when transferring torque, the first shaft 218 of FIG. 2 is rotatably coupled to the first housing 202, for example, via one or more example bearings (e.g., one or more tapered roller bearings) 239 operatively coupled to and/or interposed between the first shaft 218 and at least a portion of the first housing 202, two of which are shown in this example. Although FIG. 2 depicts the two gears 234, 236, in some examples, the gear system 206 is implemented differently, for example, using a differential, as discussed further below in connection with FIG. 8.

In some examples, the second shaft 238 does not rotate and/or otherwise does not receive the engine torque when the vehicle 100 is driving in the first driving mode. In such examples, the actuator system 208 includes another clutch (not shown) that is operatively interposed between the engine 102 and the second shaft 238 and configured to disconnect the engine 102 from the second shaft 238 when the vehicle 100 shifts or changes to and/or is in the first driving mode.

As shown in FIG. 2, the first gear 234 and the second gear 236 are positioned in the second cavity 212 to receive the first fluid 214. In such examples, in response to at least a portion (e.g., the second gear 236) of the gear system 206 rotating, the first fluid 214 flows from the second cavity 212 to the first cavity 210, for example, via a second example fluid channel 412 (shown in FIG. 4) extending from the second cavity 212 to the first cavity 210, as discussed further below in connection with FIG. 4. That is, in such examples, the gear system 206 pumps the first fluid 214 out of the second cavity 212 and into the first cavity 210. Additionally, in some such examples, to store the first fluid 214 and/or facilitate controlling a flow of the first fluid 214 into the first cavity 210, the drive unit assembly 200 includes a second example fluid reservoir (e.g., a tank or a cavity formed and/or define by the first housing 202) 240 fluidly coupled between the second cavity 212 and the first cavity 210.

The actuator system 208 of FIG. 2 can be implemented, for example, using a hydraulic actuator system. In particular, the actuator system 208 includes a first example piston 242 that is operatively coupled to the housing 202 and positioned in the first cavity 210 and/or proximate to the first port 216, which is sometimes referred to as an active piston. More particularly, the first piston 242 is configured to move toward and away from the first port 216 (e.g., in response to a fluid pressure imparted on the first piston 242), thereby controlling a flow of the first fluid 214 through the first port 216 from the second cavity 212 to the first cavity 210. In some examples, to facilitate controlling the flow of the first fluid 214 through the port 216, the first piston 242 includes an example fluid flow control portion (e.g., a flange) 244, which is discussed further below. In particular, when the first piston 242 is not actuated and/or in a first position (e.g., a retracted position), the fluid flow control portion 244 substantially covers, blocks, plugs, and/or otherwise seals the first port 216 to prevent the first fluid 214 from flowing therethrough. As shown in FIG. 2, the first piston 242 is in the first position. Conversely, when the first piston 242 is at least partially actuated and/or in a second position (e.g., an extended position), the fluid flow control portion 244 uncovers, unblocks, unplugs, and/or otherwise unseals the first port 216 to allow the first fluid 214 to flow through the first port 216 from the second cavity 212 to the first cavity 210. Thus, actuation of the first piston 242 or movement of the first piston 242 relative to the first port 216 enables the first fluid 214 to flow through the first port 216. Additionally, in some examples, the actuator system 208 is structured and/or configured to operate the clutch 204 via the first piston 242 and/or a second example piston 330 (shown in FIG. 3), as discussed further below in connection with FIG. 3.

As shown in FIG. 2, the first axle 220 is positioned in and/or extends through the first shaft 218. As such, the first shaft 218 is hollow in this example. In some examples, the first axle 220 is concentric with the first shaft 218. In particular, an outer surface (e.g., a circumferential surface) 246 of the first axle 220 is spaced from an inner surface 248 (e.g., a circumferential surface) of the first shaft 218 such that a space (e.g., a channel) 250 is defined therebetween. In this manner, the first axle 220 and the first shaft 218 do not interfere with each other when rotating. Additionally, in some examples, the first axle 220 is configured to draw the first fluid from the second fluid reservoir 240 and/or pump the first fluid 214 through the space 250 into the first cavity 210 and/or the second housing 219. In particular, in such examples, the first axle 220 includes one or more grooves (e.g., helical grooves) 252 formed by and/or positioned on the outer surface 246 and extending at least partially across a length of the first axle 220. As such, as the first axle 220 rotates, the groove(s) 252 convey the first fluid 214 therethrough to the second cavity 212. Stated differently, the groove(s) 252 carry the first fluid 214 across at least a portion of the length of the first axle 220 toward the clutch. As such, in some examples, the first axle 220 is considered a pump, which is operated by the engine torque and/or the one of the wheel(s) 106, 108 associated with the first axle 220.

In some examples, to fluidly seal the first cavity 210 and/or the second cavity 212, the drive unit assembly 200 includes one or more examples seals. For example, the drive unit assembly 200 includes a first example seal 254 operatively couple to and/or interposed between a portion of the first housing 202 and the outer surface 246 of the first axle 220. As a result, the first seal 254 and the first housing 202 form a fluid seal, thereby preventing the first fluid 214 from leaking out of the second cavity 212 through a first opening 256 positioned on the first housing 202 through which the first axle 220 extends. Further, the drive unit assembly 200 also includes a second example seal 258 operatively coupled to and/or interposed between a portion of the first housing 202 and an outer surface 260 of the second axle 222. As a result, the second seal 258 and the first housing 202 form a fluid seal, thereby preventing the first fluid 214 from leaking out of the first cavity 210 through a second opening 262 positioned on the first housing 202 through which the second axle 222 extends. Although FIG. 2 depicts the two seals 254, 258, in some examples, the drive unit assembly 200 is implemented with one or more additional, fewer, and/or different seals to appropriately seal the cavities 210, 212 of the drive unit assembly 200.

In some examples, the first housing 202 includes one or more example portions 264, 266, 268, three of which are shown in this example (i.e., a first or end portion 264, a second or intermediate portion 266, and a third or end portion 268). According to the illustrated example of FIG. 2, the first housing portion 264, the second housing portion 266, and the third housing portion 268 are coupled and/or otherwise assembled together, for example, via one or more example fasteners and/or one or more example fastening methods or techniques. As shown in FIG. 2, the second housing portion 266 is coupled to and/or interposed between the first and third housing portions 264, 268. As such, the second housing portion 266 of FIG. 2 partially forms and/or defines the first cavity 210 and the second cavity 212. For example, according to the illustrated example of FIG. 2, the second and third housing portions 266, 268 form and/or define the first cavity 210. Further, according to the illustrated example of FIG. 2, the first and second housing portions 264, 266 form and/or define the second cavity 212. Additionally, in some examples, the first and third housing portions 264 form and/or define opposite ends of the first housing 202.

Figure 3:
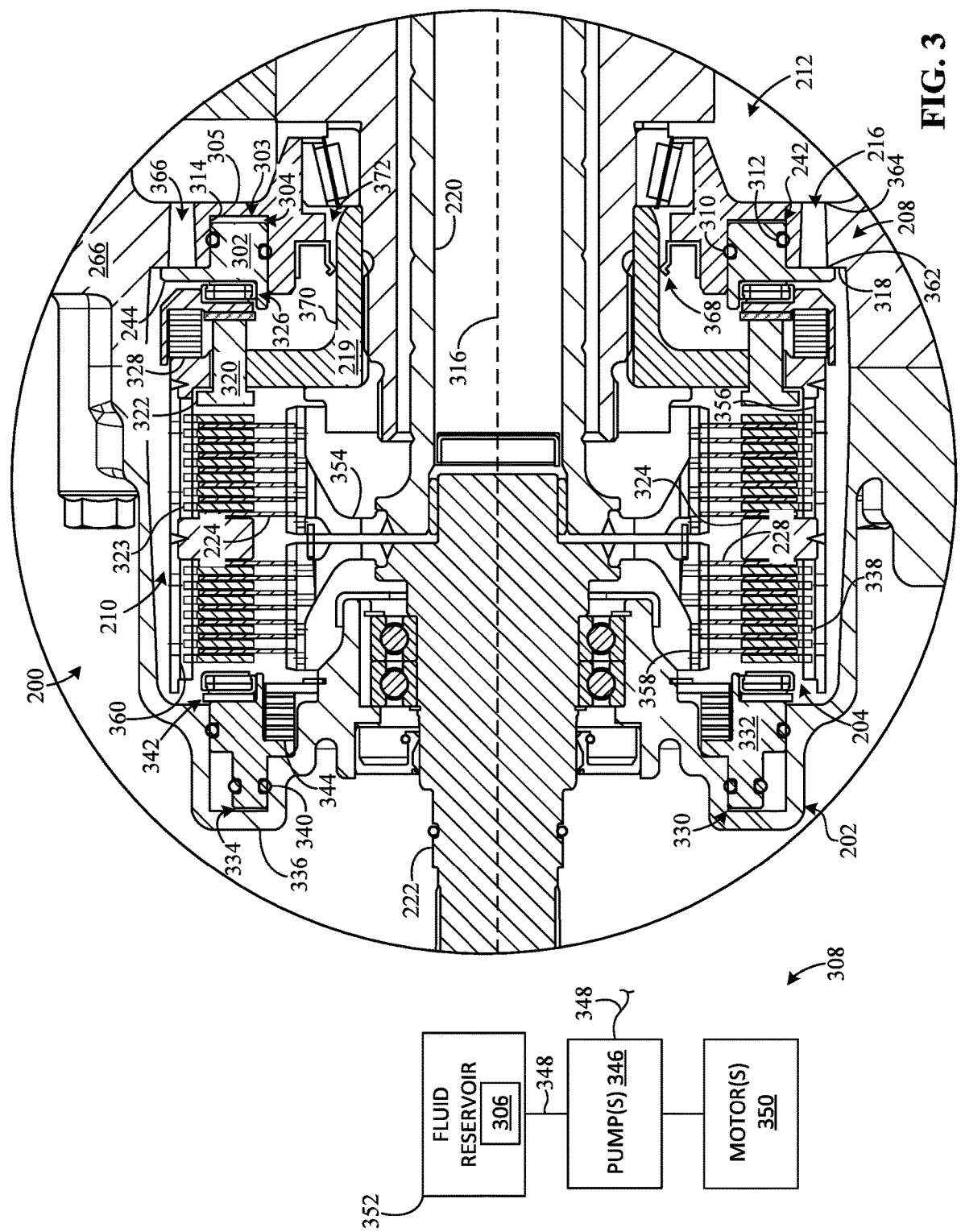
FIG. 3 is an enlarged partial-view of the drive unit assembly of FIG. 2 and shows a first example configuration of an example clutch and an example actuator system.

FIG. 3 is an enlarged partial-view of the drive unit assembly 200 of FIG. 2 and shows a first example configuration of the clutch 204 and the actuator system 208. According to the illustrated example of FIG. 3, the first piston 242 includes an example body (e.g., an annular body) 302 that is movable within a first example recessed area (e.g., an annular groove) 303 positioned on the second housing portion 266. In some examples, the second housing portion 266 includes an example wall (e.g., an annular wall) 305 that has the recessed area 303 positioned thereon, as shown in FIG. 3. As a result, in such examples, the piston body 302 and the wall 305 form and/or define a first example chamber (sometimes referred to as a fluid chamber), which facilitates control of the first piston 242. In particular, the first chamber 304 is configured to receive a second example fluid (e.g., hydraulic fluid) 306 from an example fluid supply system 308 (i.e., the first chamber 304 is in fluid communication with the fluid supply system 308). As such, in some examples, movement of the first piston 242 is based on a fluid pressure of the second fluid 306 within the first chamber 304. That is, during operation of the first piston 242, the second fluid 306 imparts a force on the first piston 242, thereby moving the first piston 242. In some examples, to maintain the fluid pressure and/or prevent the second fluid 306 from leaking out of the first chamber 304, the first piston 242 includes one or more example seals (e.g., O-rings) 310, 312 operatively coupled to and/or interposed between the body 302 and the first wall 305, two of which are shown in this example (i.e., a first seal 310 and a second seal 312). Accordingly, during operation of the first piston 242, the first seal 310 and/or the second seal 312 sealingly engage respective surfaces (e.g., circumferential surface(s)) of the body 302 and respective surfaces (e.g. circumferential surface(s)) 314 of the first wall 305 forming and/or defining the first chamber 304.

As shown in FIG. 3, the fluid flow control portion 244 of the first piston 242 extends away from the body 302 radially outward relative to a first example axis 316 of the body 302. Stated differently, the fluid flow control portion 244 protrudes from the body 302. In particular, when the first piston 242 is not actuated and/or in the first position, the fluid flow control portion 244 engages (e.g., sealingly engages) a particular area or surface on a first side 318 of the first wall 305 that surrounds and/or is proximate to the first port 216. In this manner, the fluid flow control portion 244 prevents the first fluid 214 from flowing through the first port 216. As the first piston 242 actuates and/or the body 302 moves out of the first chamber 304, the fluid flow control portion 244 separates from this area or surface of the first side 318, which enables the first fluid 214 to flow through the first port 216.

Additionally, in some examples, the first piston 242 is structured and/or configured to operate the clutch 204 and/or otherwise change at least a portion of the clutch 204 between the disengaged state and the engaged state. In some such examples, the actuator system 208 includes an example apply plate 320 that extends away from the body 302 along the first axis 316 through the second housing 219 of the clutch 204 such that an end 322 of the apply plate 320 is positioned on or near one of the first inner plate(s) 224 or one or more first outer plate(s) 323 of the clutch 204. That is, the clutch 204 of FIG. 3 also includes the first outer plate(s) 323, seven of which are shown in this example. Each of the first outer plates(s) 323 is sometimes referred to as a separator plate. As used herein, the terms "first plates" and/or "first clutch plates" refer to the first inner plate(s) 224 and the first outer plate(s) 323 of the clutch 204. The first clutch plates 224, 323 of FIG. 3 enable the clutch 204 to generate torque and/or transfer torque between the second shaft 238 and the first axle 220 based on a degree of pressure that the first plates 224, 323 impart on each other. In particular, when the first piston 242 actuates and/or moves to or toward the second position, a surface (e.g., an annular surface) at or near the end 322 is configured to engage the first plates 224, 323 and/or otherwise urge the first plates 224, 323 toward a protruding portion 324 of the second housing 219, which squeezes the first plates 224, 323 and/or increases the pressure experienced by the first plates 224, 323. Stated differently, the first piston 242 causes the apply plate 320 to impart a load on a nearest one of the first plates 224, 323. In some examples, the end 322 is defined by an annular body that extends around the first axle 220 and/or proximate to the nearest one of the first plates 224, 323, which better and/or more evenly distributes the load on the first plates 224, 323. Further, in some examples, the end 322 and/or a portion of the apply plate 320 proximate thereto limits movement of the apply plate 320 by engaging an inner portion of the second housing 219.

The apply plate 320 of the first piston 242 is slidably coupled to the second housing 219 and configured to rotate cooperatively with the second housing 219 relative to the body 302. In some examples, to facilitate transferring a load from the first piston 242 to the apply plate 320 and/or reduce friction therebetween during operation of the first piston 242, the drive unit assembly 200 of FIG. 3 includes an example bearing (e.g., a thrust bearing) 326 operatively coupled to and/or interposed between the body 302 and the apply plate 320. Further, in some examples, to facilitate positioning the piston 242, the actuator system 208 of FIG. 3 also includes one or more example springs 328 that are operatively coupled to the piston 242 and configured to urge the piston 242 away from the first plates 224, 323, which reduces (e.g., minimizes) the pressure experienced by the first plates 224, 323 when the clutch 204 is disengaged. Further, in some such examples, the end 322 of the apply plate 320 separates and/or disengages from the nearest one of the first plates 224, 323 when the first piston 242 is not in actuated and/or in the first position, which causes the first plates 224 to substantially separate and/or disengage from each other. As a result, in such examples, the clutch 204 disconnects the second shaft 238 from the first axle 220 when the vehicle 100 is operating in the first driving mode. In some examples, the apply plate 320 is a one-piece or integral component. However, in some examples, the apply plate 320 includes multiple portions, for example, radially distributed relative to the first axis 316.

Additionally, in some examples, the actuator system 208 also includes the aforementioned second piston 330, which is operatively coupled to the first housing 202 and structured and/or configured to change a different portion of the clutch 204 between the engaged state and the disengaged state, similar to the first piston 242. In some examples, a body (e.g., an annular body) 332 of the second piston 330 is positioned in a second example chamber 334, for example, that is formed and/or defined by a second wall 336 of the first housing 202 and the piston body 332. The second chamber 334 of FIG. 3 is in fluid communication with the fluid supply system 308 to receive the second fluid 306. In particular, the body 332 of FIG. 3 is configured to move toward and away from a nearest one of the second inner clutch plate(s) 228 or one or more second outer clutch plate(s) 338 based a fluid pressure of the second fluid 306 within the second chamber 334. That is, the clutch 204 of FIG. 3 also includes one or more of the second outer plate(s) 338, seven of which are shown in this example. Each of the outer plate(s) 338 of FIG. 3 is sometimes referred to as a separator plate. As used herein, the term "second plates" and/or "second clutch plates" refer to the second inner plate(s) 228 and the second outer plate(s) 338 of the clutch 204. The second clutch plates 228, 338 of FIG. 3 enable the clutch 204 to generate torque and/or transfer torque between the second axle 222 and the second shaft 238 based on a degree of pressure that the second plates 228, 338 impart on each other. In some examples, to maintain the fluid pressure and/or prevent the second fluid 306 from leaking out of the second chamber 334 during operation of the second piston 330, the second piston 330 includes one or more example seals (e.g., O-rings) 340 operatively coupled to and/or interposed between an outer surface (e.g., a circumferential surface) the body 332 and an inner surface (e.g., a circumferential surface) of the second wall 336 that forms and/or defines the second chamber 334, three of which are shown in this example.

In some examples, to facilitate transferring a load from the body 332 of the second piston 330 to the second plates 228, 338 and/or reducing friction therebetween, the drive unit assembly 200 includes an example bearing (e.g., a thrust bearing) 342 operatively coupled to and/or interposed between the body 332 and the nearest one of the second plates 228, 338. In particular, when the second piston 330 actuates, the bearing 342 urges the second plates 228, 338 toward the protruding portion 324 of the second housing 219, which squeezes the second plates 228, 338 and/or increases the pressure experienced by the second plates 228, 338. Stated differently, the bearing 342 imparts a load on a nearest one of the second plates 228, 338 when the second piston 330 actuates. Further, in some examples, the second piston 330 includes one or more example springs 344 operatively coupled to the body 332 and the second wall 336 to urge the body 332 and, thus, the bearing 342 away from the second plates 228, 338, which reduces (e.g., minimizes) the pressure experienced by the second plates 228, 338. In some such examples, the bearing 342 separates from a nearest one of the second plates 228, 338, which causes the second plates 228, 338 to separate from each other. As a result, the clutch 204 disconnects the second shaft 238 from the second axle 222 when the vehicle 100 is operated in the first driving mode. As shown in FIG. 3, the bearing 342 is spaced from the nearest one of the second plates 228, 338 by a distance (e.g., 1 inch, 0.5 inches, 0.1 inch, etc.).

As shown in FIG. 3, each of the piston bodies 302, 332 is concentric with a respective one of the axles 220, 222. However, in some examples, the first piston 242 and/or the second piston 330 are shaped, positioned, and/or otherwise implemented differently.

In some examples, for positional control of the piston(s) 242, 330, the actuator system 208 includes the fluid supply system 308, which includes one or more example pumps 346 fluidly coupled to the respective first chamber 304 and/or the second chamber 334 via one or more example fluid supply lines 348. When in operation, the pump(s) 346 of FIG. 3 are structured and/or configured to change one or more fluid parameters (e.g., a fluid pressure, a flow rate, etc.) of the second fluid 306, thereby causing the piston(s) 242, 330 to move. The fluid supply system 308 of FIG. 3 also includes one or more example motors (e.g., electric motors) 350 operatively coupled to the pump(s) 346 and communicatively coupled to the controller of the vehicle 100 to receive the power and/or the control signal(s) or command(s) therefrom. For example, the controller controls, via the motor(s) 350, the pump(s) 346 to change the fluid pressure of the second fluid 306 within the first chamber 304 and/or the second chamber 334. In this manner, disclosed examples control movement and/or a position of the piston(s) 242, 330. In some examples, the controller causes the first piston 242 to move independent of the second piston 330. In such examples, each of the chambers 304, 334 is fluidly coupled to a pump 346.

In some examples, to store the second fluid 306, the fluid supply system 308 includes a third fluid reservoir 352 fluidly coupled to the pump(s) 346 via the fluid supply line(s) 348. In such examples, the pump(s) 346 draw the second fluid 306 from the third fluid reservoir 352 and provide the second fluid 306 to the first chamber 304 and/or the second chamber 334. The components 346, 348, 350, 352 of the fluid supply system 308 are coupled to and/or positioned on the first housing 202 and/or a portion of the vehicle 100 near the first housing 202. Although FIG. 3 depicts the actuator system 208 as a hydraulic actuator system that is particularly configured, in some examples, the actuator system 208 is implemented differently to likewise and/or sufficiently control one or more of the pistons 242, 330 of the drive unit assembly 200. For example, the actuator system 208 can be implemented using one or more of an electric actuator system, a mechanical actuator system, etc., and/or any other appropriate actuator system.

As previously mentioned, the clutch 204 of FIG. 3 can provide at least a portion of the engine torque to both the first axle 220 and the second axle 222 (e.g., independent of each other). The first plates 224, 323 of FIG. 3 are configured to transfer at least a portion of the engine torque from the second housing 219 to the first axle 220 based on a position of the first piston 242 and/or the pressure experienced by the first plates 224, 323. In particular, the first inner plate(s) 224 are splined with an outer portion 354 associated with the first axle 220 such that the first inner plate(s) 224 can slide along the outer portion 354 toward and away from the first outer plate(s) 323 while maintaining an orientation thereof relative to the first axle 220 and/or the outer portion 354 (i.e., the first inner plate(s) 224 rotate cooperatively with the first axle 220). Similarly, the first outer plate(s) 323 are splined with a first inner portion 356 of the second housing 219 such that the first outer plate(s) 323 can slide along the first inner portion 356 toward and the away from the first inner plate(s) 224 while maintaining an orientation thereof relative to the second housing 219 (i.e., the first outer plate(s) 323 rotate cooperatively with the second housing 219). That is, the first inner plate(s) 224 are slidably coupled (e.g., via slots or grooves disposed on the outer portion 354) to the outer portion 354, and the first outer plate(s) 323 are slidably coupled (e.g., via slots or grooves disposed on the first inner portion 356) to the first inner portion 356. As a result, the first plates 224, 323 better engage with and disengage from each other and, in some examples where the second shaft 238 disconnects from the first axle 220, separate from each other.

Similarly, the second plates 228, 338 are configured to transfer at least a portion of the engine torque from the second shaft 238 to the second axle 222 based on a position of the second piston 330 and/or the pressure experienced by the second plates 228, 338. In particular, the second inner plate(s) 228 are splined with an outer portion 358 associated with the second axle 222 such that the second inner plate(s) 228 can slide along the outer portion 358 toward and away from the second outer plate(s) 338 while maintaining an orientation thereof relative to the second axle 222 and/or the outer portion 358 (i.e., the second inner plate(s) 228 rotate cooperatively with the second axle 222). Similarly, the second outer plate(s) 338 are splined with a second example inner portion 360 of the second housing 219 such that the second outer plate(s) 338 can slide along the second inner portion 360 toward and away from the second inner plates 228 while maintaining an orientation thereof relative to the second housing 219 (i.e., the second outer plate(s) 338 rotate cooperatively with the second housing 219). That is, the second inner plate(s) 228 are slidably coupled (e.g., via slots or grooves disposed on the outer portion 358) to the outer portion 358, and the second outer plate(s) 338 are slidably coupled (e.g., via slots or grooves disposed on the second inner portion 360) to the second inner portion 360. As a result, the second plates 228, 338 better engage with and disengage from each other and, in some examples where the second shaft 238 disconnects from the second axle 222, separate from each other.

As shown in FIG. 3, the protruding portion 324 of the second housing 219 is interposed between the first plates 224, 323 and the second plates 228, 338. The protruding portion 324 is affixed to the second housing 219 and extends radially inward relative the first axis 316. In some examples, the protruding portion 324 is annularly shaped to engage a larger surface area of a nearest one of the first plates 224, 323 and the second plates 228, 338.

The first port 216 is sized, shaped, structured, and/or otherwise configured to rapidly convey the fluid 214 from the first cavity 210 to the second cavity 212 when the first piston 216 actuates and/or moves away from the first position (e.g., when the vehicle 100 changes from the first driving mode to the second driving mode). In some examples, the first port 216 is tapered. That is, first port 216 includes a cross-sectional area or diameter that varies across a length of the first port 216 and/or between a first end 362 of the first port 216 and a second end 364 of the first port 216 opposite the first end 362. For example, the cross-sectional area or diameter at the first end 362 is greater than the cross-sectional area or diameter at the second end 364. However, in some examples, the first port 216 is implemented differently. For example, the cross-sectional area or diameter of the first port 216 can be substantially uniform across the length and/or from the first end 362 to the second end 364.

In some examples, the first port 216 is positioned at or near an end of the first wall 305 such as, for example, at or near a lowermost portion of the first housing 202. In this manner, the first port 216 is submerged below a surface of the first fluid 214 (e.g., after the first fluid 214 accumulates in the second cavity 212), which allows gravity and/or fluid pressure to effectively urge the first fluid 214 through the first port 216 when the first port 216 is unblocked. However, in some examples, the first port 216 is positioned on the second housing portion 266 in a different location.

Although FIG. 3 depicts the single port 216, in some examples, in addition or alternatively to the first port 216, the first housing 202 includes one or more other ports (e.g., similar or different relative to the first port 216) that extend through the first wall 305 from the first cavity 210 to the second cavity 212 and/or otherwise fluidly couple the cavities 210, 212 together, which may provide the first fluid 214 to the second cavity 212 in a more effective manner compared to a single port. In such examples, the multiple ports 216 are radially distributed on the first wall 305 relative to the first axis 316. In particular, in such examples, the fluid flow control portion 244 of the first piston 242 is configured to the control a flow of the first fluid 214 through each port 216 based on movement of the first piston 242.

In some examples, to further fluidly seal the cavities 210, 212, the drive unit assembly 200 of FIG. 3 includes a third example seal 368 operatively coupled to and/or interposed between a portion of the first wall 305 and an outer surface 370 of the second housing 219 that extends through an example aperture (e.g., a circular opening) 372 positioned on the first wall 305. As shown in FIG. 3, the opening 372 of the first wall 305 receives a portion of the first shaft 218 and the second axle 222 in addition to the second housing 219. In particular, the third seal 368 is effective in preventing the first fluid 214 from leaking or flowing between the first and second cavity 210, 212. As shown in FIG. 3, the first wall 305 extends toward the first axle 220 radially inward relative to the first axis 316 to partially form and/or define the first cavity 210 and the second cavity 212.

Figure 4:
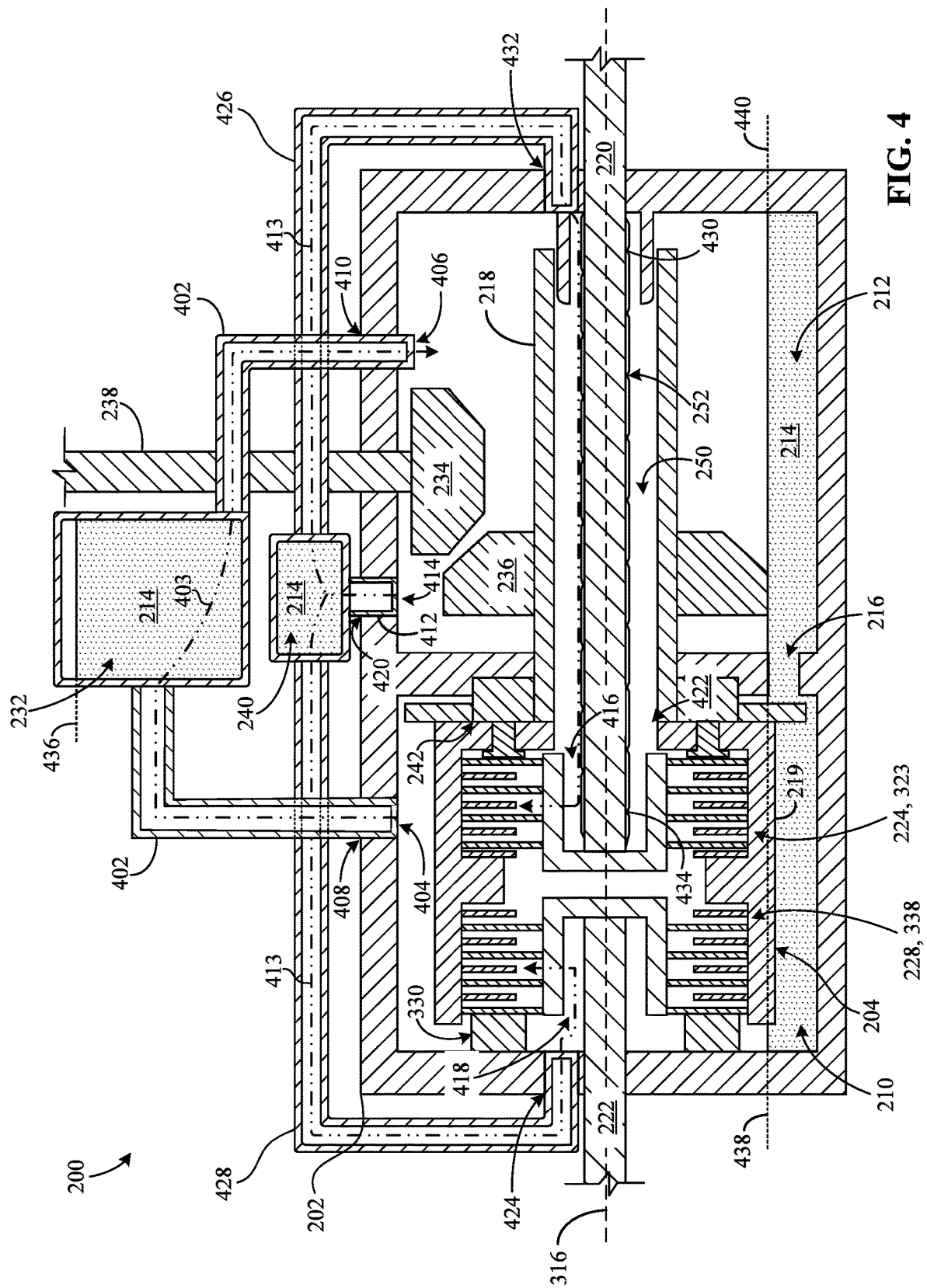
FIGS. 4-7 are schematic illustrations of the example drive unit assembly of FIGS. 2 and 3 and show example fluid flow based on different vehicle driving modes.

FIGS. 4-7 are schematic illustrations of the drive unit assembly 200 of FIGS. 2 and 3 and show example fluid flow based on the vehicle 100 operating in the different driving modes. According to the illustrated example of FIG. 4, to facilitate conveying the first fluid 214, the drive unit assembly 200 includes the aforementioned first fluid channel 402 that extends from the first cavity 210 to the second cavity 212, thereby fluidly coupling the first cavity 210 to the second cavity 212. The first fluid channel 402 provides a first example flow path 403 (as represented by the dotted/dashed lines in FIG. 4) along which the first fluid 214 flows. In some examples, the first fluid channel 402 is formed and/or defined by the first housing 202 and/or one or more other components (e.g., a tube, a pipe, etc.). As shown in FIG. 4, the first fluid channel 402 is coupled to the housing 202 and at least partially positioned external to the first cavity 210 and the second cavity 212. In particular, as the second housing 219 of the clutch 204 rotates relative to the first axis 316 associated therewith, the first fluid 214 moves or is urged away from the second housing 219 radially outward relative to the first axis 316 such that the first fluid 214 flows into an inlet 404 of the first channel 402 and then out of an outlet 406 of the first channel 402.

As shown in FIG. 4, the inlet 404 of the first channel 402 is positioned in or near first cavity 210 to receive the first fluid 214 therefrom. For example, the inlet 404 is adjacent to and/or extends through a third opening 408 positioned on a portion of the first housing 202 associated with the first cavity 210. Further, the outlet 406 of the first channel 402 is positioned in or near the second cavity 212 to provide the first fluid 214 thereto. For example, the outlet 406 is adjacent to and/or extends through a fourth opening 410 positioned on another portion of the first housing 202 associated with the second cavity 212.

Additionally, in some examples, the first channel 402 includes the first fluid reservoir 232 to store the first fluid 214, as previously mentioned. As shown in FIG. 4, the first fluid reservoir 232 is fluidly coupled to the first channel 402 and interposed between the inlet 404 and the outlet 406. The first fluid reservoir 232 may be implemented, for example, using a tank (sometimes referred to as a catch tank) that is coupled to the first housing 202. In some examples, the first channel 402 and/or the first fluid reservoir 232 are sized, shaped, structured, and/or otherwise configured such that when the vehicle 100 is driving in the second driving mode (i.e., the clutch is 204 engaged), the first fluid 214 flows into the first fluid reservoir 232 at a first flow rate and flows out of the first fluid reservoir 232 at a second flow rate (e.g., a restricted flow rate) less than the first flow rate, which allows the first fluid 214 to accumulate in the first fluid reservoir 232 (e.g., until a steady state fluid level is reached).

To further facilitate conveying the first fluid 214, the drive unit assembly 200 of FIG. 4 includes the aforementioned second fluid channel 412 that extends from the second cavity 212 to the first cavity 210, thereby fluidly coupling the second cavity 212 to the first cavity 210. The second fluid channel 412 provides a second example flow path 413 (as represented by the dotted/dashed lines in FIG. 4) along which the first fluid 214 is to flow. In some examples, the first fluid channel 402 is formed and/or defined by the first housing 202 and/or one or more other components (e.g., a tube, a pipe, etc.). As shown in FIG. 4, the second fluid channel 412 is coupled to the housing 202 and at least partially positioned external to the first cavity 210 and the second cavity 212. In particular, as the second gear 236 rotates relative to the first axis 316 associated therewith, the first fluid 214 moves or is urged away from the second gear 236 radially outward relative to the first axis 316 such that the first fluid 214 flows into an inlet 414 of the second channel 412 and then out of one or more outlets 416, 418 of the second channel 412, two of which are shown in this example (i.e., a first outlet 416 and a second outlet 418).

As shown in FIG. 4, the inlet 414 of the second channel 412 is positioned in or near the second cavity 212 to receive the first fluid 214 therefrom. For example, the inlet 414 is adjacent to and/or extends through a fifth opening 420 positioned on the first housing 202. Further, the first and second outlets 416, 418 are positioned in and/or near the first cavity 210 to provide the first fluid 214 to the plates 224, 323, 228, 338 of the clutch 204. For example, the first outlet 416 is adjacent to and/or extends through an opening 422 positioned on the second housing 219 to direct the first fluid 214 out of the second channel 412 and/or onto the first clutch plates 224, 323. Further, the second outlet 418 is adjacent to and/or extends through a sixth opening 424 positioned on the first housing 202 to direct the first fluid 214 out of the second channel 412 and/or onto the second clutch plates 228, 338. As such, in the illustrated example of FIG. 4, the second channel 412 includes a first portion 426 and a second portion 428 that diverge from each other. In some examples, after the first fluid 214 flows through the inlet 414, the first fluid 214 then flows through the first portion 426 and the second portion 428 in different directions (e.g., opposite directions). The first portion 426 of FIG. 4 includes the first outlet 416, and the second portion 428 of FIG. 4 includes the second outlet 418.

Additionally, in some examples, the first portion 426 of the second fluid channel 412 includes the space 250 formed by the first shaft 218 and the first axle 220 (i.e., the second fluid channel 412 is partially formed and/or defined by the space 250), as shown in FIG. 4. In such examples, at least one of the groove(s) 252 of the first axle 220 includes a first end 430 that receives the first fluid 214 from a seventh opening 432 positioned on the first housing 202 through which the first portion 426 of the second fluid channel 412 extends. As such, the first end 430 of the groove 252 of FIG. 4 is positioned proximate to the seventh opening 432. In some examples, as the first axle 220 rotates, the groove 252 draws the first fluid 214 from the second cavity 212 and/or the second fluid reservoir 240 and urges the first fluid 214 to move through the groove 252 along the first axle 220 toward the first cavity 210 and/or the clutch 204. The groove 252 of FIG. 4 also includes a second end 434, opposite the first end 430, positioned near the outer portion 354 of the first axle 220 and/or the first plates 224, 323 to expel the first fluid 214 from the groove 252.

Additionally, in some examples, the second fluid channel 412 includes the second fluid reservoir 240 to store the first fluid 214, as previously mentioned. The second fluid reservoir 240 may be implemented, for example, using a tank coupled to the first housing 202. As shown in FIG. 2, the second fluid reservoir 240 is fluidly coupled to the second fluid channel 412 and interposed between the inlet 414, the first outlet 416, and the second outlet 418 of the second channel 412.

According to the illustrated example of FIG. 4, the vehicle 100 is driving in the second driving mode. That is, the clutch 204 transfers torque between the axles 220, 222 and the second shaft 238 based on actuation of the first piston 242 and/or the second piston 330. As such, each of the first shaft 218, the second housing 219, the first gear 234, the second gear 236, the second shaft 238, the first axle 220, and the second axle 222 are rotating in this example due to the engine torque and/or rotation of the rear road wheel(s) 108. As shown in FIG. 4, the first piston 242 is in the second position and/or otherwise actuated to engage at least a portion (e.g., the first clutch plates 224, 323) of the clutch 204 and allow the first fluid 214 to flow through the first port 216. In particular, the first fluid 214 of FIG. 4 continuously circulates through the drive unit assembly 200 (e.g., after the second housing 219 and the second gear 236 rotate for a substantial time interval), which lubricates and/or cools one or more of the components in the first housing 202. More particularly, in such examples, the first fluid 214 substantially flows: (1) through the first fluid channel 402 from the first cavity 210 to the second cavity 212; (2) through the second fluid channel 412 from the second cavity 212 to the first cavity 210; and (3) through the port 216 (e.g., from the second cavity 212 to the first cavity 210). This flow of the first fluid 214 is primarily caused by rotation of the second housing 219 and the second gear 236. However, in some examples, rotation of the first axle 220 and/or the second axle 222 facilitate the flow of the first fluid 216 through the channel(s) 402, 412. As a result of such fluid circulation, the first outlet 406 of the first fluid channel 402 provides (e.g., continuously or repeatedly) the first fluid 214 to the first gear 234 and/or the second gear 236. Further, the first outlet 416 of the second channel 412 provides (e.g., continuously or repeatedly) the first fluid 214 to the first plates 224, 323 inside of the second housing 219, and the second outlet 418 of the second fluid channel 412 provides (e.g., continuously or repeatedly) the first fluid 214 to the second plates 228, 338 inside the second housing 219. Additionally, in some examples, this circulation of the first fluid 214 lubricates one or more of the bearings 226, 230, 239, 326, 342 of the drive unit assembly 200.

In some examples, when the vehicle 100 has been operating in the second driving mode for a substantial time interval, each of the first fluid reservoir 232, the second fluid reservoir 240, the first cavity 210, and the second cavity 212 substantially reaches a steady state fluid level of the first fluid 214, as shown in FIG. 4. For example, the first fluid reservoir 232 of FIG. 4 has a particular amount of the first fluid 214 therein, which is indicated by a first or initial example fluid level 436 (as represented by the dotted/dashed line in FIG. 4) associated with the first fluid reservoir 232. Further, the second fluid reservoir 240 of FIG. 4 is substantially full of the first fluid 214. Further still, each of the first and second cavities 210, 212 of FIG. 4 has a particular amount of the first fluid 214 therein, which is indicated by a first or initial example fluid level 438 (as represented by the dotted/dashed lines in FIG. 4) associated with the first cavity 210 and a first or initial example fluid level 440 associated with the second cavity 212. As shown in FIG. 4, the first fluid levels 438, 440 associated with the respective first and second cavities 210, 212 are substantially equal or the same.

Figure 5:
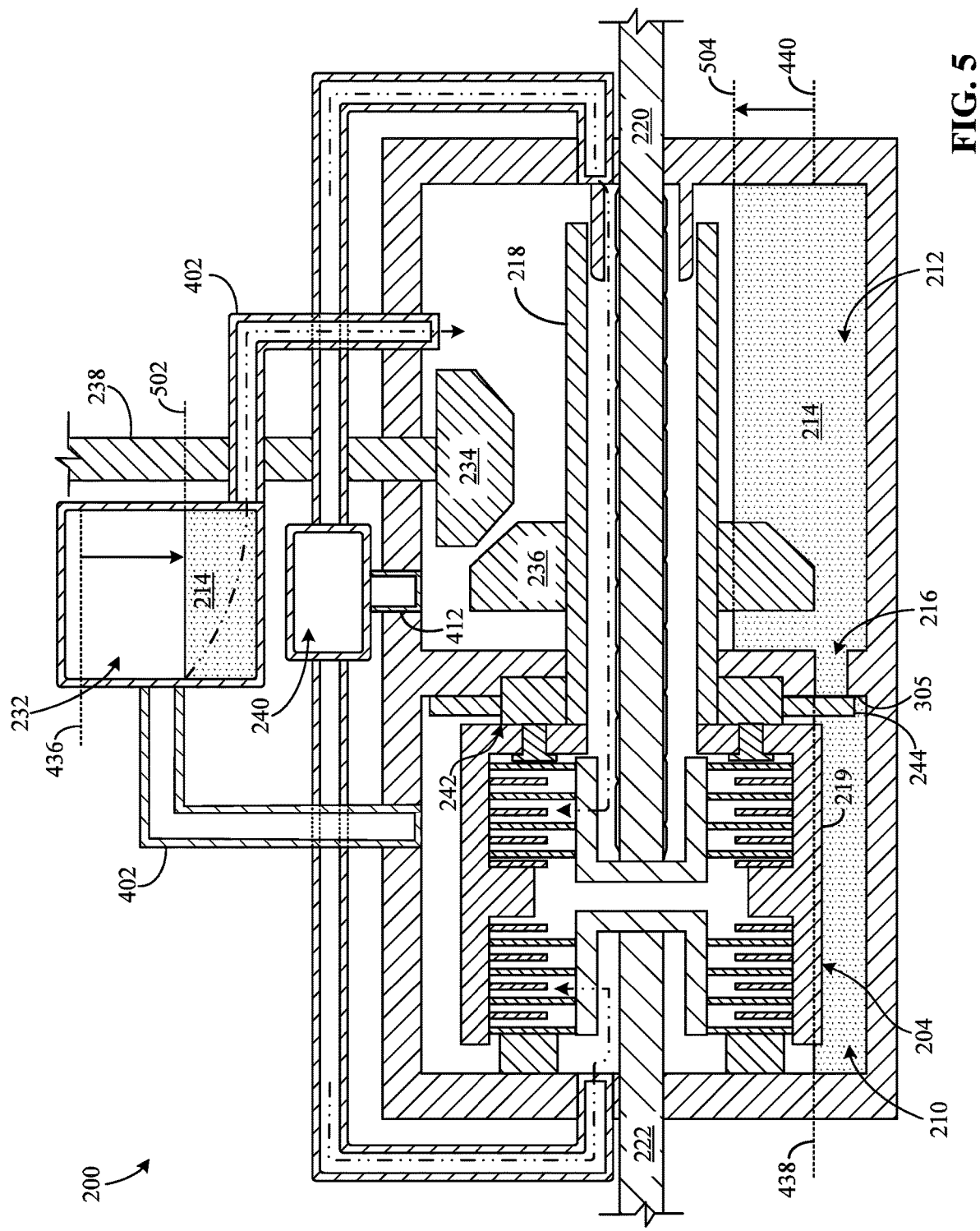

According to the illustrated example of FIG. 5, the vehicle 100 shifted or changed from the second driving mode to the first driving mode. In other words, the vehicle 100 is operating in the first driving mode. That is, the clutch 204 is in the disengaged state and, thus, is not substantially transferring torque between the second shaft 238 and the axles 220, 222 in this example. As such, the first axle 220 and the second axle 222 are substantially rotating due to rotation of the road wheel(s) 106, 108. On the other hand, one or more (e.g., all) of the first shaft 218, the second housing 219, the first gear 234, the second gear 236, and/or the second shaft 238 are not substantially rotating (e.g., stopped) or are decelerating due to the second shaft 238 being disconnected from the engine 102 and the clutch 204 being in the disengaged state. As shown in FIG. 5, the first piston 242 is in the first position and/or otherwise not actuated to prevent the first fluid 214 from flowing through the first port 216, which allows the first fluid 214 to accumulate in the second cavity 212. That is, the fluid flow control portion 244 of FIG. 5 is substantially sealing the first port 216, for example, via a fluid seal formed by a surface of the fluid flow control portion 244 and a surface of the first wall 305. In particular, circulation of the first fluid 214 for the drive unit assembly 200 has substantially ceased in the illustrated example of FIG. 5. However, in some examples, the first fluid 214 may still flow for a relatively short time interval through at least a portion of the first fluid channel 402 (e.g., while the first fluid reservoir 232 is draining) and through at least a portion of the second fluid channel 412 (e.g., while the second fluid reservoir 240 is draining).

As shown in FIG. 5, the first fluid reservoir 232 of FIG. 5 has drained a portion of the first fluid 214 therein, which is indicated by a second example fluid level 502 associated with the first fluid reservoir 232. As such, the second fluid level 502 is less than the first fluid level 436. Further, the second fluid reservoir 240 and the second fluid channel 412 have substantially drained the first fluid 240 therein (e.g., the second fluid reservoir 240 and the second fluid channel 412 are empty). On the other hand, the amount of the first fluid 214 in the first cavity 210 has not substantially changed. As such, the first fluid level 438 associated with the first cavity 210 has not substantially increased or decreased. However, the amount of the first fluid 214 in the second cavity 212 has increased, as indicated by the second example fluid level 504 associated with the second cavity 212. As such, the second fluid level 504 is greater than the first fluid level 440 associated with the second cavity 212. In some examples, the amount of the first fluid 214 in the second cavity 212 continues to increase when the vehicle 100 is operating in the first driving mode until the first fluid 214 has substantially emptied from the first fluid reservoir 232 and/or the first fluid channel 402.

Figure 6:
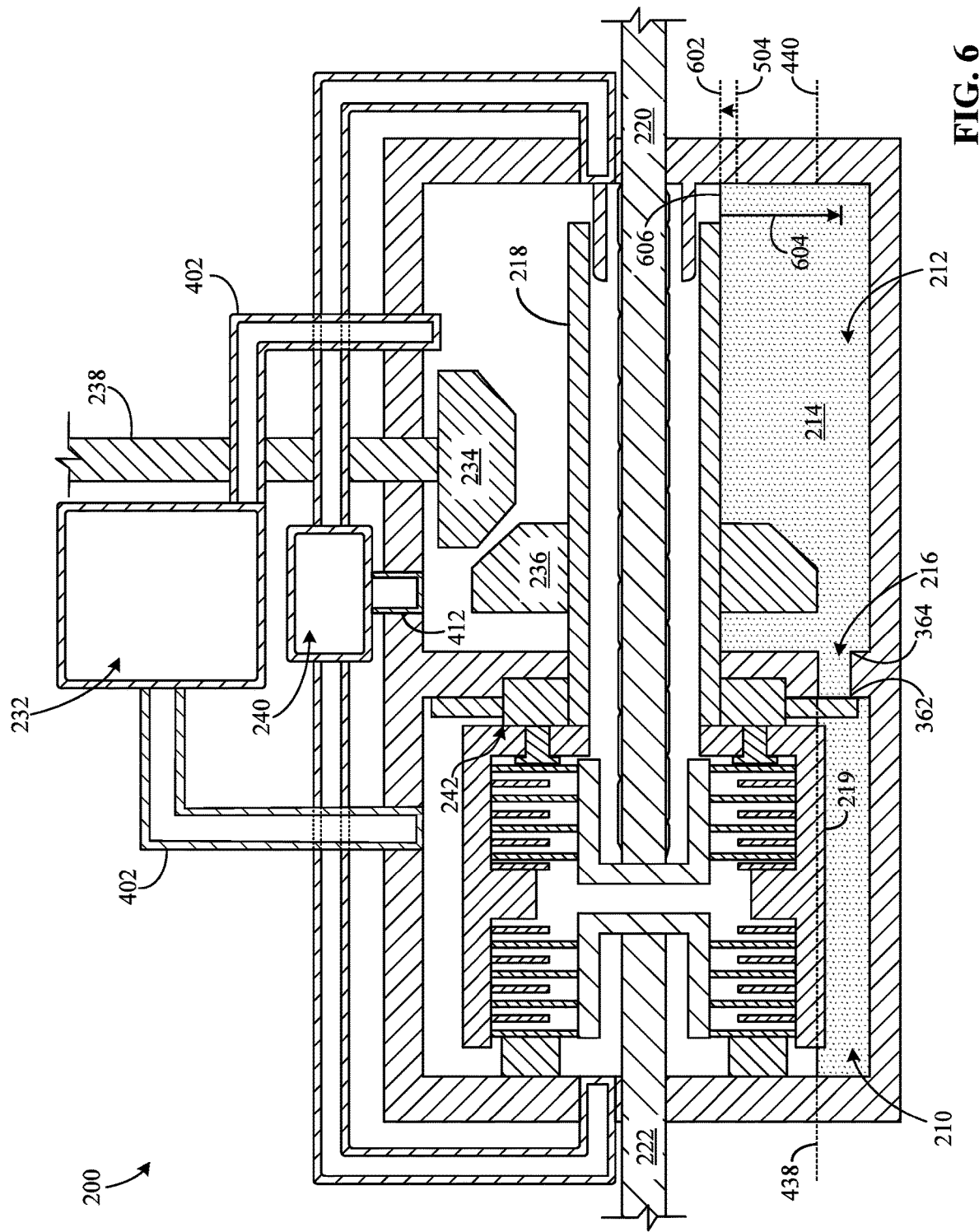

According to the illustrated example of FIG. 6, the vehicle 100 has been operating in the first driving mode for a substantial time interval. As a result, each of the first fluid reservoir 232, the second fluid reservoir 240, the first cavity 210, and the second cavity 212 has reached a steady state fluid level of the first fluid 214 for the first driving mode, which is different relative to the steady state fluid level for the second driving mode shown in FIG. 4. As shown in FIG. 6, each of the first fluid reservoir 232, the second fluid reservoir 240, the first fluid channel 402, and the second fluid channel 412 is substantially empty and/or otherwise does not contain a substantial amount of the first fluid 214. Further, the amount of the first fluid 214 in the first cavity 210 has not substantially changed (i.e., the first fluid level 438 associated with the first cavity 210 has not increased or decreased). However, the amount of the first fluid 214 in the second cavity 212 has increased, which is indicated by a third example fluid level 602 associated with the second cavity 212. As such, the third example fluid level 602 is greater than the first fluid level 440 and the second fluid level 504 associated with the second cavity 212.

As shown in FIG. 6, the first port 216 is positioned at a particular depth 604 in the first fluid 216 that is below a surface 606 of the first fluid 214 within the second cavity 212. In such examples, gravity and/or a fluid pressure of the first fluid 214 at or near the depth 604 effectively urges the first fluid 214 through the first port 216 when the first piston 242 actuates or moves toward the second position. In particular, the first port 216 experiences a fluid pressure differential across its length in response to movement of the first piston 242. That is, in such examples, the fluid pressure of the first fluid 216 within the second cavity 212 at or near the second end 364 is greater than the fluid pressure of the first fluid 216 within the first cavity 210 at or near the first end 362. Such a difference in the fluid pressure rapidly provides the first fluid 216 through the first port 216 and to the clutch 204 (e.g., before the clutch 204 generates torque), which improves clutch performance.

Figure 7:
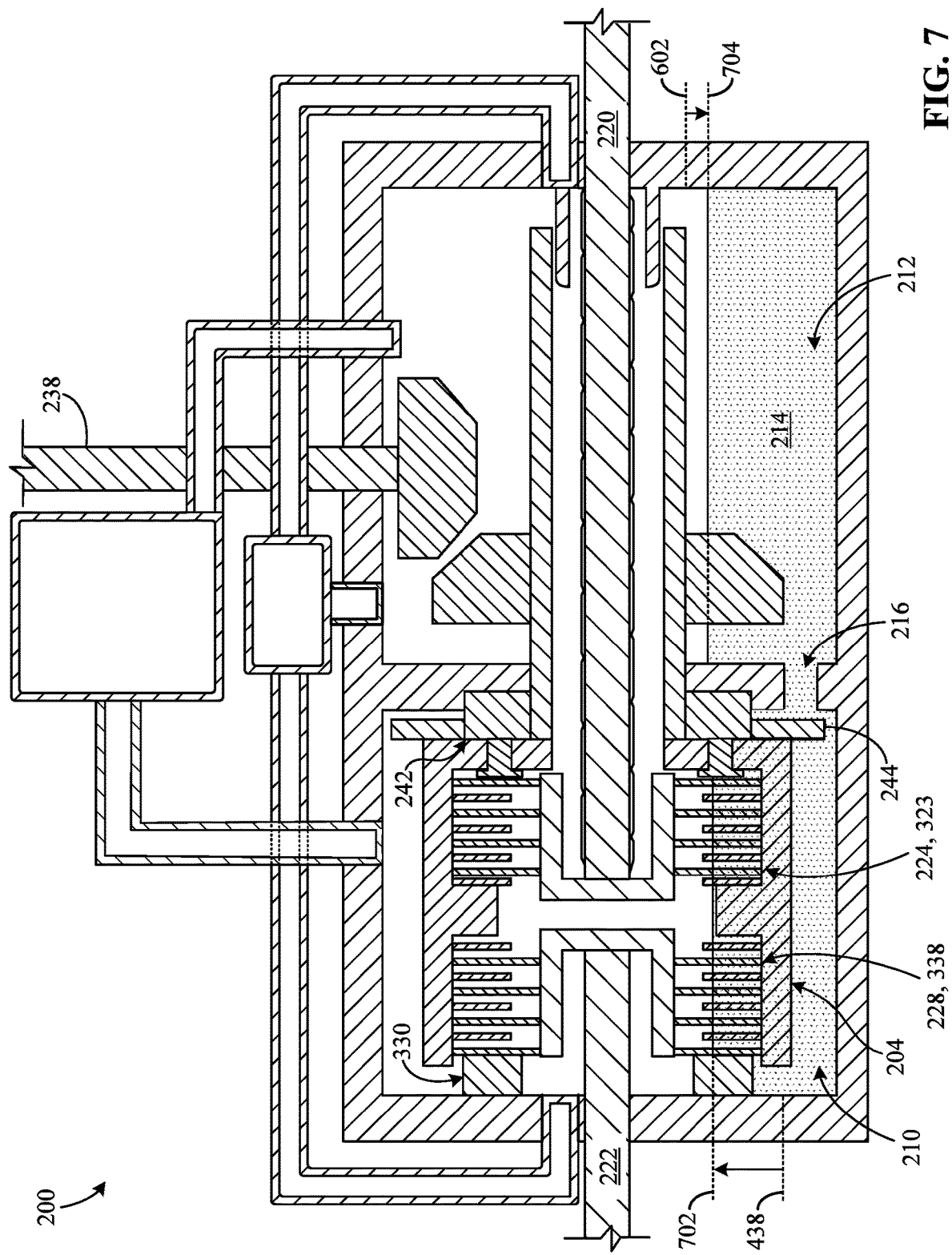

According to the illustrated example of FIG. 7, the vehicle 100 shifted or changed from the first driving mode back to the second driving mode. That is, the clutch 204 generates torque for the axles 220, 222 and/or otherwise transfers torque (e.g., a relatively low amount or degree of torque) between the axles 220, 222 and the second shaft 238 based on actuation of the first piston 242 and the second piston 330. In some examples, the second shaft 238 of FIG. 7 accelerates or speeds up (i.e., a rate of rotation of the second shaft 238 increases) to match a speed at which the vehicle 100 is moving. Stated differently, in such examples, the second shaft 238 has a rate of rotation that is less than a rate of rotation of the axles 220, 222 during a particular time interval (sometimes referred to as a synchronization phase).

In particular, as the fluid flow control portion 244 moves away from the first port 216 (and/or one or more other ports), the first fluid 214 stored in the second cavity 212 rapidly and/or sufficiently flows through the first port 216 from the second cavity 212 to the first cavity 210, which keeps the clutch 204 lubricated and/or cool during the synchronization phase. As shown in FIG. 7, the amount of the first fluid 214 within the first cavity 210 and the second cavity 212 has respectively increased and decreased, as indicated by a second example fluid level 702 (as represented by the dotted/dashed lines of FIG. 7) associated with the first cavity 210 and a fourth example fluid level 704 (as represented by the dotted/dashed lines of FIG. 7) associated with the second cavity 212. As such, the second fluid level 702 is greater than the first fluid level 438 associated with the first cavity 210, and the fourth fluid level 704 is less than the third fluid level 602 associated with the second cavity 212. In some examples, the second fluid level 702 associated with the first cavity 210 is substantially the same or equal to the fourth fluid level 704 associated with the second cavity 212.

The second fluid level 702 of FIG. 7 is above a bottom-most (in the orientation of FIG. 7) portion of the second housing 219 such that the clutch plates 224, 323, 228, 338 are substantially immersed in the first fluid 214. In this manner, a sufficient amount of the first fluid 214 is provided to the clutch plates 224, 323, 228, 338 to maintain a temperature thereof before the synchronization phase is complete, which enables the clutch plates 224, 323, 228, 338 to generate an increased (e.g., a maximum) amount of torque without damaging and/or otherwise adversely affecting the plates 224, 323, 228, 338 due to high temperature and/or friction.

Although FIGS. 2-7 depict the components of the drive unit assembly 200 and/or, more generally, the drive unit assembly 200 having a particular structure and/or configuration, in some examples, one or more of the components of the drive unit assembly 200 and/or, more generally, the drive unit assembly 200 is implemented differently, as discussed in greater detail below in connection with FIGS. 8-14.

Figure 8:
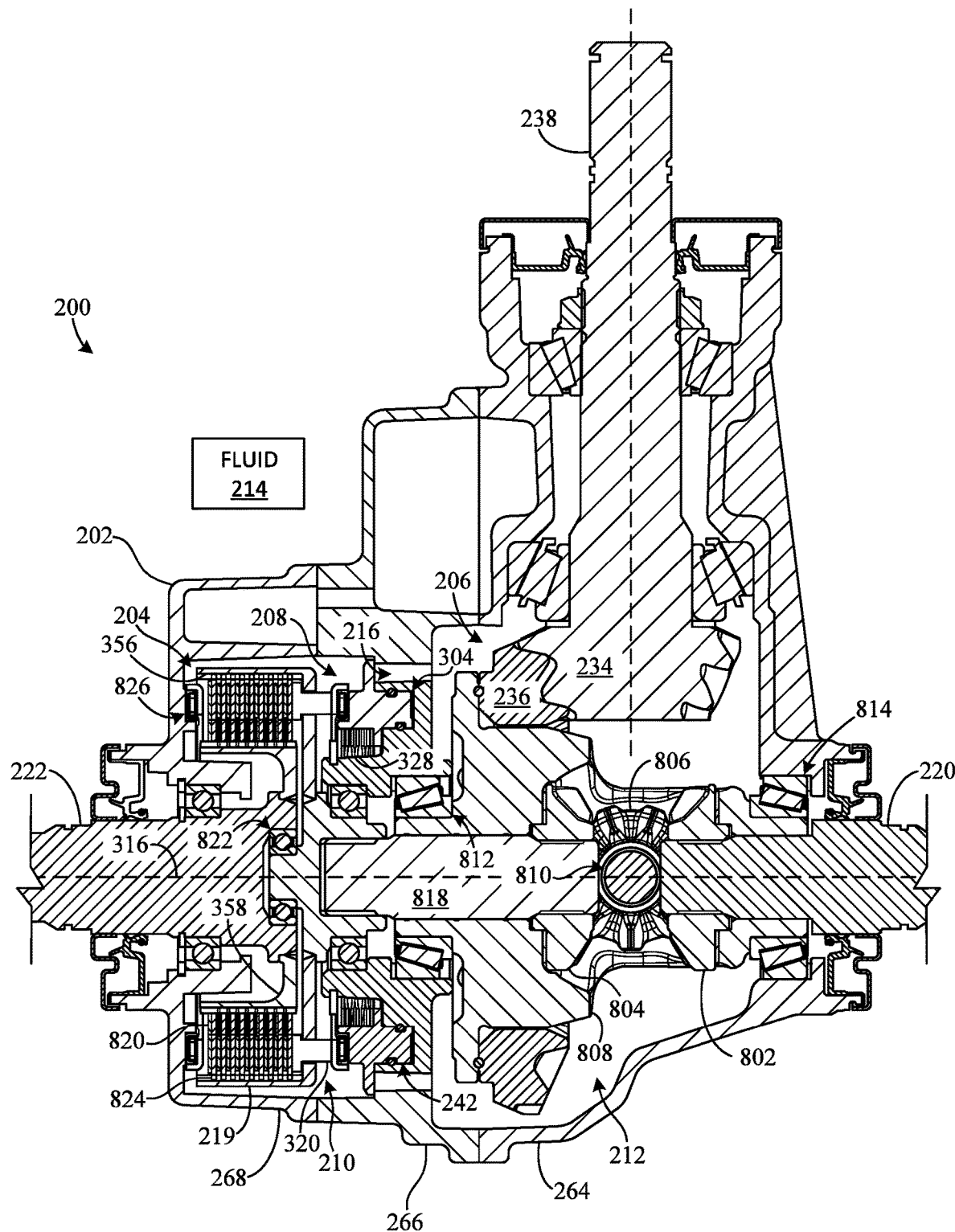
FIG. 8 is another cross-sectional view of the drive unit assembly of FIG. 2 and shows a second example configuration thereof in accordance with the teachings of this disclosure.

FIG. 8 is another cross-sectional view of the drive unit assembly 200 and shows a second example configuration thereof. In some examples, the drive unit assembly 200 of FIG. 8 is used to implement at least a portion of the drivetrain system 104 of FIG. 1. In particular, the clutch 204 of FIG. 8 is implemented using a single clutch. According to the illustrated example of FIG. 8, the clutch 204 is operatively coupled to and/or interposed between the gear system 206 and the first or second axle 220, 222 and configured to transfer torque between the gear system 206 and the first or second axle 220, 222 based on the state of the clutch 204. Additionally, the gear system 206 of FIG. 8 is implemented using a differential.

As shown in FIG. 8, the gear system 206 includes a third example gear (e.g., a bevel gear) 802 associated with the first axle 220 and a fourth example gear (e.g., a bevel gear) 804 associated with the second axle 222. Additionally, in some such examples, the gear system 206 of FIG. 8 also includes one or more intermediate gears (e.g., one or more bevel gears) 806 meshed with and/or operatively coupled between the third and fourth gears 802, 804 and configured to transfer torque therebetween, one of which is shown in this example. Each of the intermediate gears 806 of FIG. 8 is rotatably coupled to an example cage or carrier 808 of the gear system 206, for example, via one or more example bearings 810 (one of which is shown in this example). The carrier 808 of FIG. 8 is coupled to the second gear 236, for example, via one or more example fasteners and/or one or more example fastening methods or techniques. As a result, in such examples, the second gear 236, the intermediate gear(s) 806, and the carrier 808 can rotate cooperatively, for example, relative to the first axis 316 during vehicle operation. Further, each of the intermediate gear(s) 806 can also rotate relative to the respective bearing(s) 810. In some examples, to stabilize and/or facilitate rotational movement the second gear 236 and/or the carrier 808, the drive unit assembly 200 of FIG. 8 also includes one or more example bearings (e.g., one or more tapered roller bearings) 812, 814 operatively coupled to and/or interposed between the carrier 808 and the first housing 202, two of which are shown in this example.

In some examples, as shown in FIG. 8, the third gear 802 is coupled (e.g., directly and/or via one or more intermediate components) to the first axle 220 to transfer torque between the intermediate gear(s) 806 and the first axle 220, for example, using one or more examples fasteners and/or one or more example fastening methods or techniques. Further, the fourth gear 804 is coupled (e.g., directly and/or via one or more intermediate components) to a portion (e.g., the second housing 219) of the clutch 204 to transfer torque between the intermediate gear(s) 806 and the portion of the clutch 204, for example, using one or more examples fasteners and/or one or more example fastening methods or techniques. In some examples, the drive unit assembly 200 of FIG. 8 includes a third example shaft 818 extending from the fourth gear 804 to the second housing 219, as shown in FIG. 8. In such examples, the third shaft 818 is coupled to a portion (e.g., an inner surface and/or a circumferential surface) of the fourth gear 804 and a portion (e.g., an inner surface and/or a circumferential surface) of the second housing 219, for example, via one or more example fasteners and/or one or more example fastening methods or techniques. As a result, the second housing 219, the fourth gear 804, and the third shaft 818 can rotate cooperatively, for example, relative to the first axis 316 during vehicle operation.

According to the illustrated example of FIG. 8, the gear system 206 includes a first example portion (e.g., an input), a second example portion (e.g., a first output), and a third example portion (e.g., a second output). In particular, the gear system 206 of FIG. 8 is structured and/or configured to distribute engine torque and/or otherwise transfer the engine torque from the first portion to the second portion and/or the third portion. In some examples, the first portion of the gear system 206 of FIG. 8 is formed and/or defined by one or more (e.g., all) of the first gear 234, the second gear 236, the second shaft 238, the intermediate gear(s) 806, and/or the carrier 808. Further, in some examples, the second portion of the gear system 206 of FIG. 8 is formed and/or defined by the third gear 802 and/or the first axle 220. Further still, in some examples, the third portion of the gear system 206 of FIG. 8 is formed and/or defined by the fourth gear 804 and/or the third shaft 818.

The clutch 204 of FIG. 8 is configured to control an amount or degree of engine torque transferred from the second shaft 238 to one or more of the wheel(s) 106, 108 based on the state of the clutch 204. For example, the clutch 204 receives the engine torque from the gear system 206 via the fourth gear 804 and/or the third shaft 818 when the vehicle 100 is operating in the second driving mode. In response, when the clutch 204 is in the engaged state and/or at least partially engaged, the clutch 204 generates torque for the second axle 222 and/or otherwise transfers at least a portion of the engine torque from the third shaft 818 to the second axle 222. Additionally, as a result of such engagement of the clutch 204, the third shaft 818 and/or the fourth gear 804 experience an inertia associated with the second axle 222, which causes the gear system 206 of FIG. 8 to also transfer at least a portion of the engine torque from the second shaft 238 to the third gear 802 and, thus, the first axle 220. That is, the fourth gear 804 applies a substantial resistance to the intermediate gear(s) 806 when the clutch 204 is in the engaged state. In this manner, the clutch 204 facilitates operation of the gear system 206 of FIG. 8 by connecting the second axle 222 to the fourth gear 804.

As shown in FIG. 8, the clutch 204 is at least partially positioned in the first cavity 210 of the first housing 202. In some examples, in response to at least a portion (e.g., the second housing 219) of the clutch 204 rotating relative to the first axis 316, the first fluid 214 flows from the first cavity 210 to the second cavity 212, for example, via the first fluid channel 402, as previously mentioned. Further, as shown in FIG. 8, the first gear 234, the second gear 236, the third gear 802, the fourth gear 804, the intermediate gear(s) 806, and the carrier 808 are positioned in the second cavity 212 to receive the first fluid 214. In some examples, in response to at least a portion (e.g., the second gear 238) of the gear system 206 rotating, the first fluid 214 flows from the second cavity 212 to the first cavity 210, for example, via the second fluid channel 412, as previously mentioned.

The second axle 222 of FIG. 8 is coupled to one or more third example inner discs or plates (e.g., annular plates) 820 of the clutch 204. That is, the clutch 204 of FIG. 8 includes the third inner plate(s) 820. As such, when the clutch 204 is at least partially engaged, the engine torque causes the third inner plate(s) 820 and second axle 222 to rotate cooperatively, for example, relative to the first axis 316. Additionally, in some examples, to stabilize and/or facilitate rotational movement of the second axle 222 and/or the third inner plate(s) 820, the second axle 222 is rotatably coupled to the second housing 219, for example, via an example bearing (e.g., a bearing) 822 operatively coupled to and/or interposed between the second axle 222 and a portion of the second housing 219.

The actuator system 208 of FIG. 8 includes the first piston 242 but not the second piston 330. In other words, the actuator system 208 of FIG. 8 includes a single piston 242. As previously mentioned, the first piston 242 is configured to move relative to the first port 216 (e.g., via the second fluid 306 provided to the first piston 242 from the fluid supply system 308), thereby controlling the flow of the fluid 214 through the first port 216 from the second cavity 212 to the first cavity 210. Additionally, in some examples, the first piston 242 is configured to operate the clutch 204. In such examples, the apply plate 320 of FIG. 8 is positioned on or near the third inner plates 820 and/or one or more third example outer discs or plate(s) (e.g., annular plates) 824 of the clutch 204. That is, the clutch 204 of FIG. 8 includes the third outer plate(s) 824, each of which is sometimes referred to as a separator plate. As used herein, the terms "third plates" and/or "third clutch plates" refer to the third inner plate(s) 820 and the third outer plate(s) 824 of the clutch 204 of FIG. 8. The third clutch plates 820, 824 of FIG. 8 enable the clutch 204 to generate torque and/or transfer torque between the third shaft 818 and the second axle 222 based on a degree of pressure that the third plates 820, 824 impart on each other. In particular, when the first piston 242 actuates and/or moves toward the second position (e.g., via the fluid pressure in the first chamber 304), the apply plate 320 urges the third plates 820, 824 toward and/or into engagement with an example bearing (e.g., a thrust bearing) 826, which squeezes the third plates 820, 824 and/or increases the pressure experienced by the third plates 820, 824. In some examples, the bearing 826 is positioned on and/or coupled to the third housing portion 268.

Thus, the third plates 820, 824 of FIG. 8 are configured to transfer at least a portion of the engine torque from the second housing 219 to the second axle 222 based on a position of the first piston 242 and/or the pressure experienced by the third plates 820, 824. In particular, the third inner plate(s) 820 are splined with the outer portion 358 associated with the second axle 222 such that the third inner plate(s) 820 can slide along the outer portion 358 toward and away from the third outer plate(s) 824 while maintaining an orientation thereof relative to the second axle 222 and/or the outer portion 358 (i.e., the third inner plate(s) 820 rotate cooperatively with the second axle 222). Similarly, the third outer plate(s) 824 are splined with the first inner portion 356 of the second housing 219 such that the first outer plate(s) 323 can slide along the first inner portion 356 toward and the away from third inner plate(s) 820 while maintaining an orientation thereof relative to the second housing 219 (i.e., the third outer plate(s) 824 rotate cooperatively with the second housing 219). That is, the third inner plate(s) 820 are slidably coupled (e.g., via slots or grooves disposed on the outer portion 358) to the outer portion 358, and the third outer plate(s) 824 are slidably coupled (e.g., via slots or grooves disposed on the first inner portion 356) to the first inner portion 356. As a result, the third plates 820, 824 better engage with and disengage from each other.

In some examples, to facilitate positioning the apply plate 320 and/or the first piston 242, the spring(s) 328 of FIG. 8 are operatively coupled to the first piston 242. As shown in FIG. 8, the spring(s) 328 are interposed between the first piston 242 and a portion of the first housing 202. In such examples, the spring(s) 328 urge the first piston 242 away from the third clutch plates 820, 824.

FIGS. 9-12 are schematic illustrations of the drive unit assembly 200 of FIG. 8 and show example fluid flow based on the vehicle 100 operating in the different driving modes, for example, similar to the schematic illustrations shown in FIGS. 4-7. As such, in some examples, in response to rotation of the second housing 219, the first fluid 214 is urged and/or pumped out of the first cavity 210 and into the second cavity 212 and/or the first fluid reservoir 232, for example, via the first fluid channel 402 (a portion of which is shown in this example). In some such examples, as previously mentioned, the first fluid reservoir 232 drains the first fluid 214 into the second cavity 212 at a restricted rate, which allows the first fluid 216 to accumulate in the first fluid reservoir 232 when the vehicle is operating in the second driving mode. Additionally, the first fluid reservoir 232 facilitates maintaining sufficient levels of the first fluid 216 within the drive unit assembly 200 when the first fluid 216 is circulating therethrough. Further, in some examples, in response to rotation of at least a portion (e.g., one or more of the gears 234, 236, 802, 804, 806 and/or the carrier 808) of the gear system 206, the first fluid 214 is urged and/or pumped out of the second cavity 212 and into the first cavity 210 and/or the second fluid reservoir 240, for example, via the second fluid channel 412 (a portion of which is shown in this example).

Figure 9:
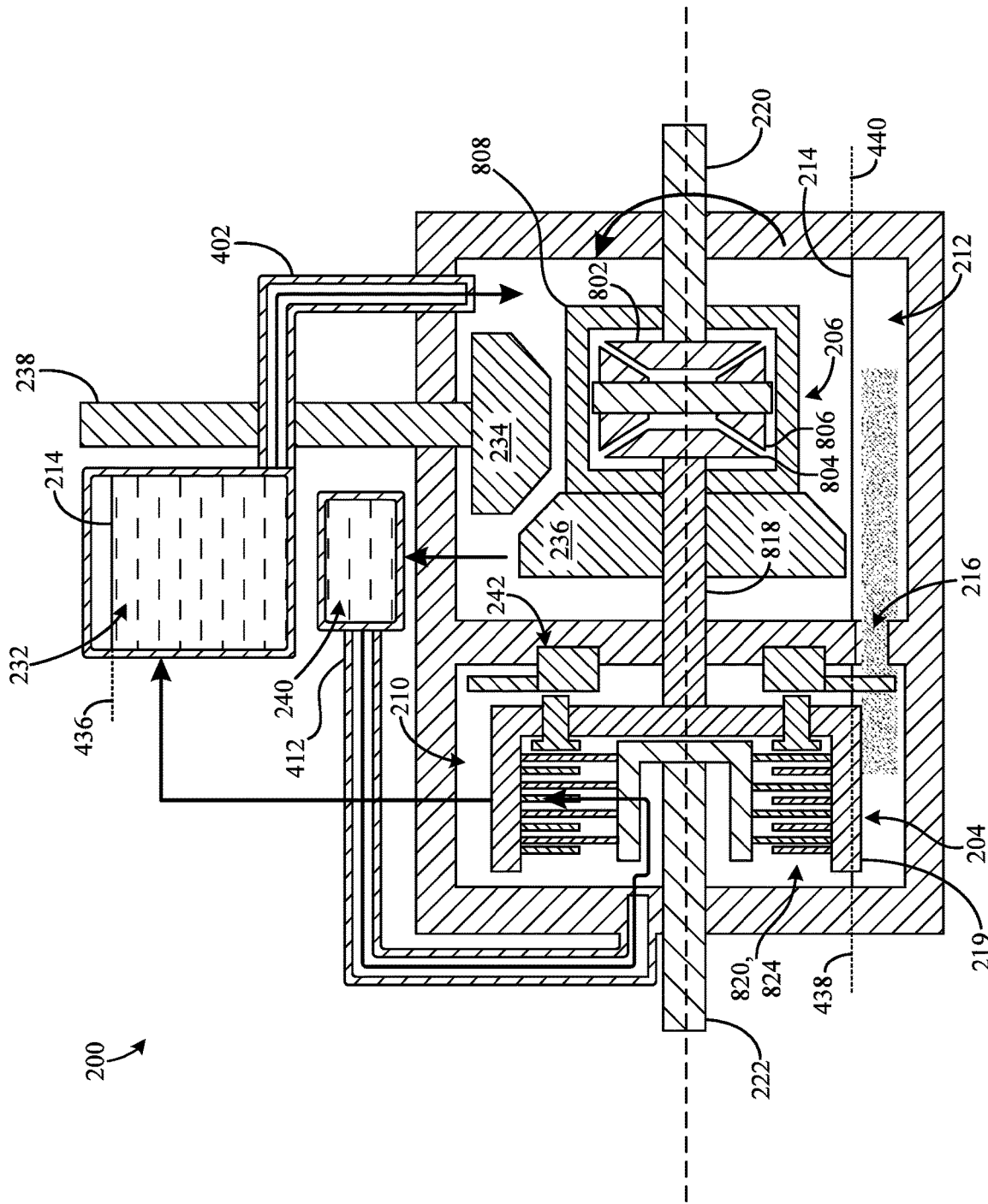
FIGS. 9-12 are schematic illustrations of the drive unit assembly of FIG. 8 and show example fluid flow based on different vehicle driving modes.

According to the illustrated example of FIG. 9, the vehicle 100 is driving in the second driving mode such that the clutch 204 enables torque transfer between the second shaft 238 and the axle(s) 220, 222. As a result, one or more (e.g., all) rotatable components of the drive unit assembly 200 of FIG. 9 are rotating due to the engine torque and/or rotation of the road wheel(s), 106, 108 such as, for example, the second housing 219 of the clutch 204, the first axle 220, the second axle 222, the first gear 234, the second gear 236, the third gear 802, the fourth gear 804, the second shaft 238, the third shaft 818, the carrier 808, etc. In particular, the first piston 242 of FIG. 9 is in or near the second position and/or otherwise actuated (e.g., to engage and/or squeeze one or more of the third clutch plates 820, 824), which allows the first fluid 214 to flow through the first port 216. Accordingly, the clutch 204 of FIG. 9 is in the engaged state or at least partially engaged. In some examples, the first fluid 214 of FIG. 9 continuously circulates through the drive unit assembly 200 (e.g., after the second housing 219 and the second gear 236 rotate for a substantial time interval), which lubricates and/or cools one or more of the components of the drive unit assembly 200.

In some examples, when the vehicle 100 has been operating in the second driving mode for a substantial time interval, each of the first fluid reservoir 232, the second fluid reservoir 240, the first cavity 210, and the second cavity 212 reach a steady state fluid level of the first fluid 214, as shown in FIG. 9. That is, the first fluid reservoir 232 of FIG. 9 has a particular amount of the first fluid 214 therein, which is indicated by the first fluid level 436 associated with the first fluid reservoir 232. Further, the second fluid reservoir 240 of FIG. 9 is substantially full (e.g., completely full) of the first fluid 214. Further still, each of the first and second cavities 210, 212 of FIG. 9 has a particular amount of the first fluid 214 therein, which is indicated by the first or initial fluid level 438 associated with the first cavity 210 and the first or initial fluid level 440 associated with the second cavity 212. In some examples, the first fluid levels 438, 440 associated with the respective first and second cavities 210, 212 are substantially equal or the same, as shown in FIG. 9.

Figure 10:
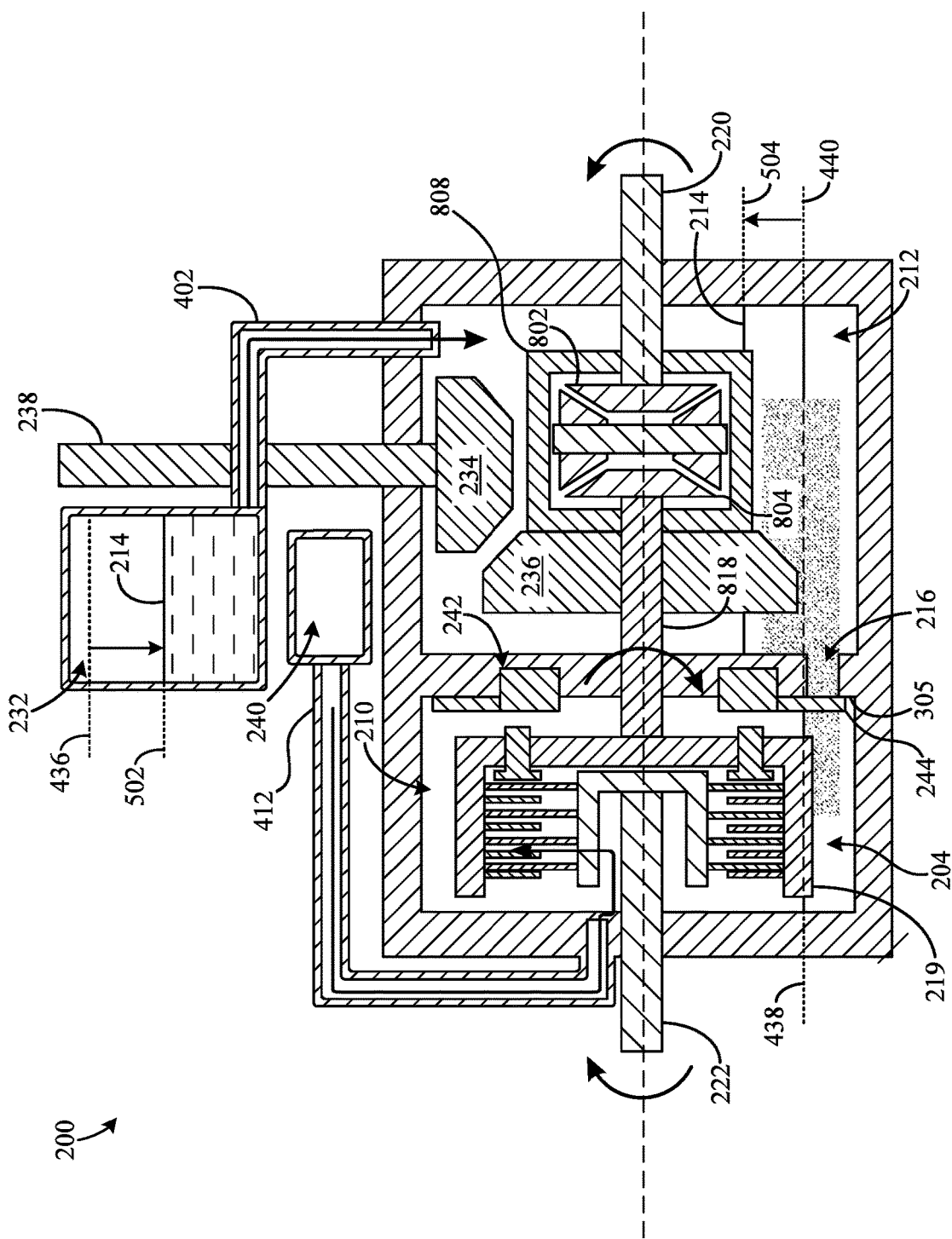

According to the illustrated example of FIG. 10, the vehicle 100 shifted or changed from the second driving mode to the first driving mode. That is, the clutch 204 is in the disengaged state or substantially disengaged and, thus, is not substantially enabling torque transfer between the second shaft 238 and the axle(s) 220, 222 in this example. As such, in this example, the first axle 220, the second axle 222, the second housing 219, the third gear 802, the fourth gear 804, and the third shaft 818 are substantially rotating due to rotation of the road wheel(s) 106, 108. On the other hand, the first gear 234, the second gear 236, the second shaft 238, and the carrier 808 are not substantially rotating (e.g., stopped) or are decelerating. As shown in FIG. 10, the first piston 242 is in or near the first position and/or otherwise not actuated to prevent the first fluid 214 from flowing through the first port 216, which allows the first fluid 214 to accumulate in the second cavity 212. That is, the fluid flow control portion 244 of FIG. 10 is substantially sealing the first port 216, for example, via a fluid seal formed by the fluid control portion 244 and the first wall 305. In some examples, circulation of the first fluid 214 through the drive unit assembly 200 substantially ceases when the vehicle 100 operates in the first driving mode.

As shown in FIG. 10, the first fluid reservoir 232 of FIG. 10 has drained a portion of the first fluid 214 therein, which is indicated by the second fluid level 502 associated with the first fluid reservoir 232. As such, the second fluid level 502 associated with the first fluid reservoir 232 is less than the first fluid level 436 associated with the first fluid reservoir 232. Further, the second fluid reservoir 240 and the second fluid channel 412 have substantially drained the first fluid 240 therein (e.g., the second fluid reservoir 240 and the second fluid channel 412 are empty). Further, the amount of the first fluid 214 in the first cavity 210 has not substantially changed. As such, the first fluid level 438 associated with the first cavity 210 has not substantially increased or decreased. However, the amount of the first fluid 214 in the second cavity 212 has increased, as indicated by the second example fluid level 504 associated with the second cavity 212. As such, the second fluid level 504 associated with the second cavity 212 is greater than the first fluid level 440 associated with the second cavity 212. In some examples, the amount of the first fluid 214 in the second cavity 212 continues to increase when the vehicle 100 is operating in the first driving mode until the first fluid 214 has substantially emptied from the first fluid reservoir 232 and/or the first fluid channel 402.

Figure 11:
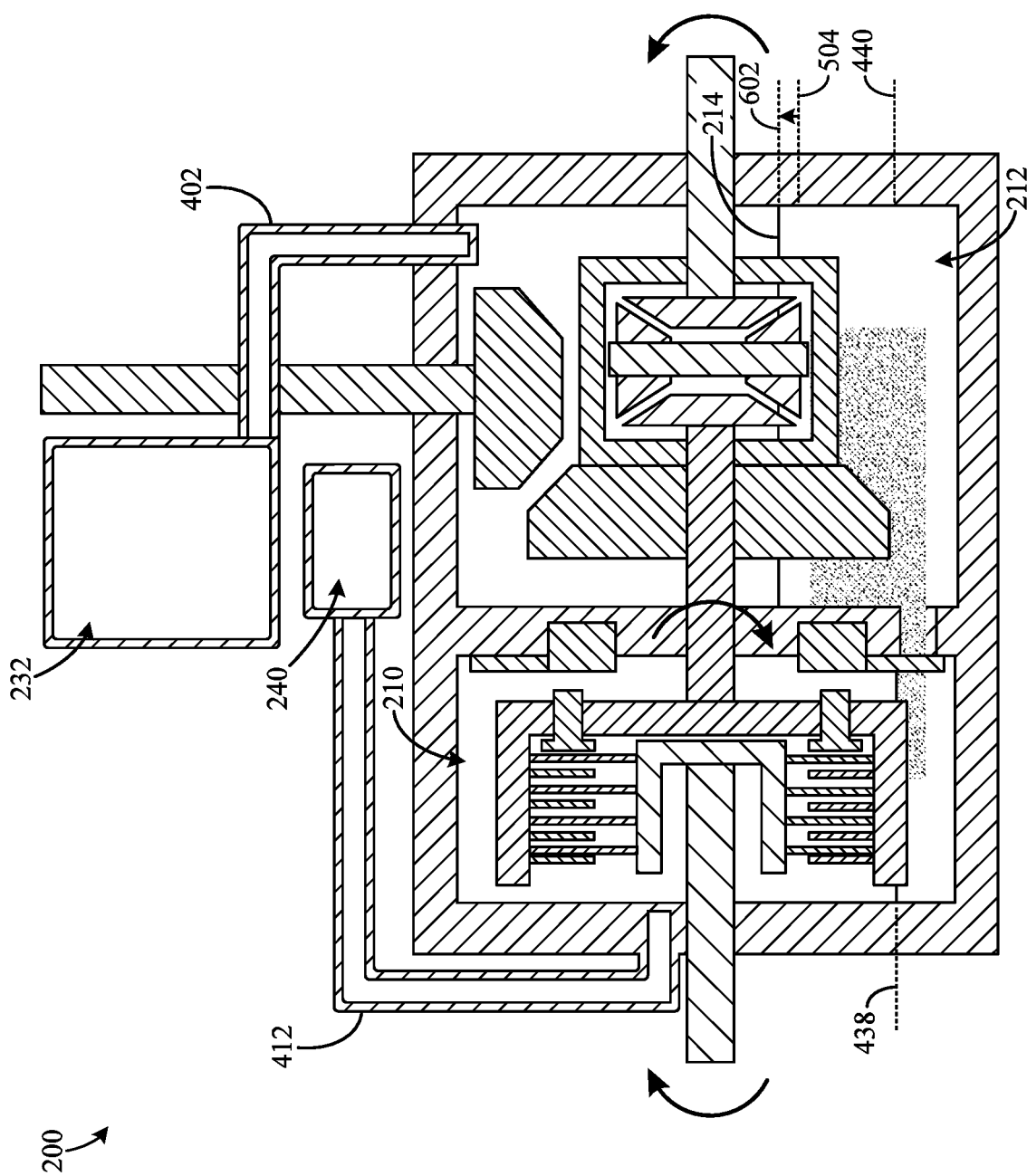

According to the illustrated example of FIG. 11, the vehicle 100 has been operating in the first driving mode for a substantial time interval. As a result, each of the first fluid reservoir 232, the second fluid reservoir 240, the first cavity 210, and the second cavity 212 has reached a steady state fluid level of the first fluid 214 for the first driving mode, which is different relative to the steady state fluid level for the second driving mode shown in FIG. 9. As shown in FIG. 11, each of the first fluid reservoir 232, the second fluid reservoir 240, the first fluid channel 402, and the second fluid channel 412 is substantially empty and/or otherwise does not contain a substantial amount of the first fluid 214. Further, the amount of the first fluid 214 in the first cavity 210 has not substantially changed (i.e., the first fluid level 438 associated with the first cavity 210 has not increased or decreased). However, the amount of the first fluid 214 in the second cavity 212 has increased, which is indicated by the third example fluid level 602 associated with the second cavity 212. As such, the third fluid level 602 associated with the second cavity 212 is greater than the first fluid level 440 and the second fluid level 504 associated with the second cavity 212.

Figure 12:
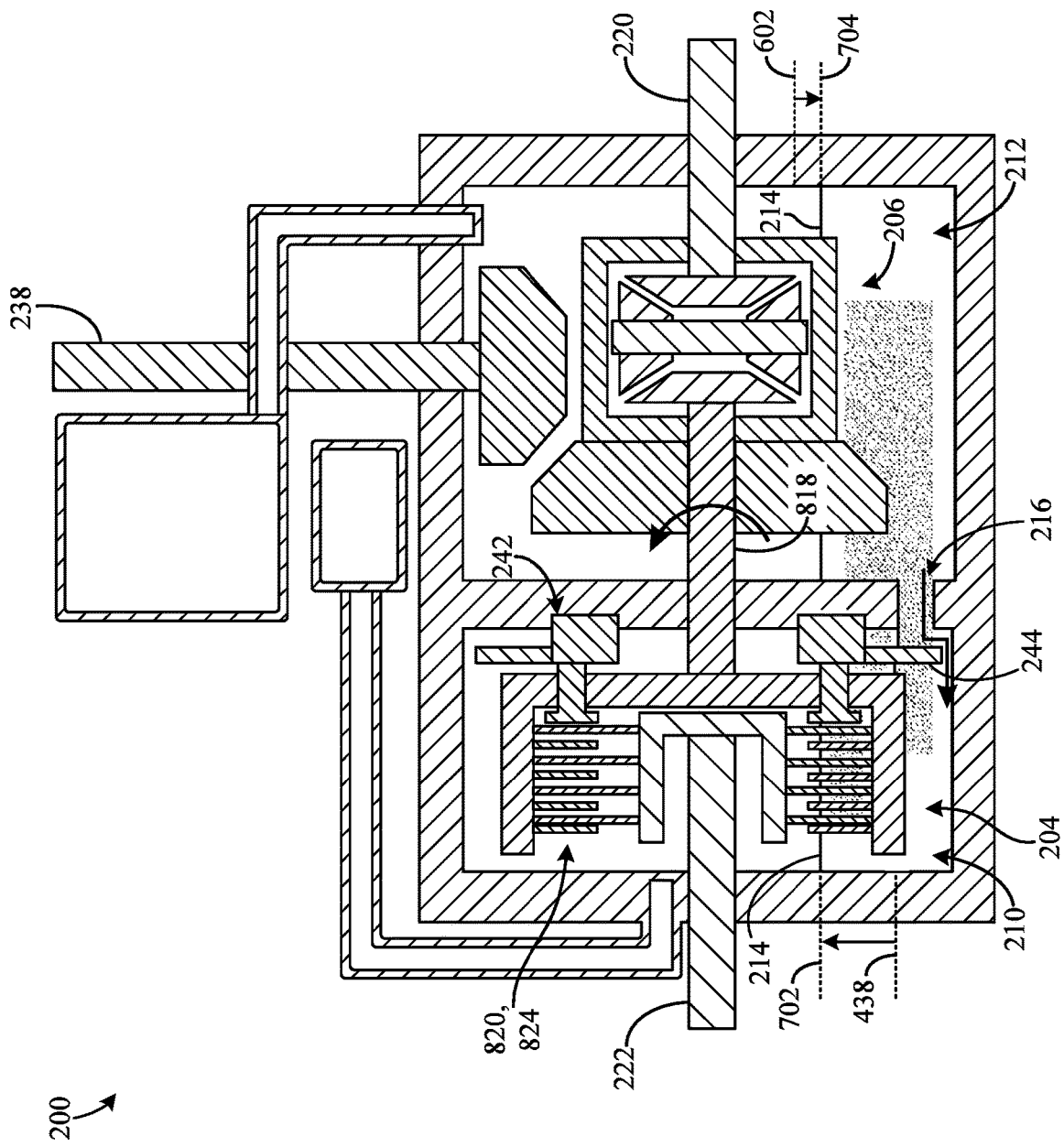

According to the illustrated example of FIG. 12, the vehicle 100 shifted or changed from the first driving mode back to the second driving mode. That is, the clutch 204 of FIG. 12 transfers torque (e.g., a relatively low amount or degree of torque) between the second axle 222 and the third shaft 818 based on actuation of the first piston 242. Stated differently, actuation or movement of the first piston 242 commands and/or controls the clutch 204 to generate torque and/or otherwise transfer torque between the second shaft 238 and the second axle 222 via the gear system 206. In some examples, the second shaft 238 accelerates or speeds up (i.e., a rate of rotation of the second shaft 238 is increases) to match a speed at which the vehicle 100 is moving. In other words, the second shaft 238 has a rate of rotation that is less than a rate of rotation of the axle(s) 220, 222 during the synchronization phase associated with the drive unit assembly 200.

In particular, as the fluid flow control portion 244 moves away from the first port 216, the first fluid 214 stored in the second cavity 212 rapidly and/or sufficiently flows through the first port 216 from the second cavity 212 to the first cavity 210, which keeps the clutch 204 properly lubricated and/or cool during the synchronization phase. In this manner, a sufficient amount of the first fluid 214 is provided to the third clutch plates 820, 824 to maintain a temperature thereof before the synchronization phase is complete, which enables the third clutch plates 820, 824 to generate an increased (e.g., a maximum) amount of torque without damaging the plates 820, 824 due to high temperature and/or friction.

As shown in FIG. 12, the amount of the first fluid 214 within the first cavity 210 and the second cavity 212 has respectively increased and decreased as a result of the first fluid 214 flowing through the first port 216, which is indicated by the second example fluid level 702 associated with the first cavity 210 and the fourth example fluid level 704 associated with the second cavity 212. As such, the second fluid level 702 associated with the first cavity 210 is greater than the first fluid level 438 associated with the first cavity 210, and the fourth fluid level 704 associated with the second cavity 212 is less than the third fluid level 602 associated with the second cavity 212. In some examples, the second fluid level 702 associated with the first cavity 210 is substantially the same or equal to the fourth fluid level 704 associated with the second cavity 212 during at least a portion of the synchronization phase. In some such examples, the second fluid level 702 associated with the first cavity 210 is above a bottommost (in the orientation of FIG. 12) portion of the second housing 219 such that the clutch plates 820, 824 are substantially immersed in the first fluid 214.

Figure 13:
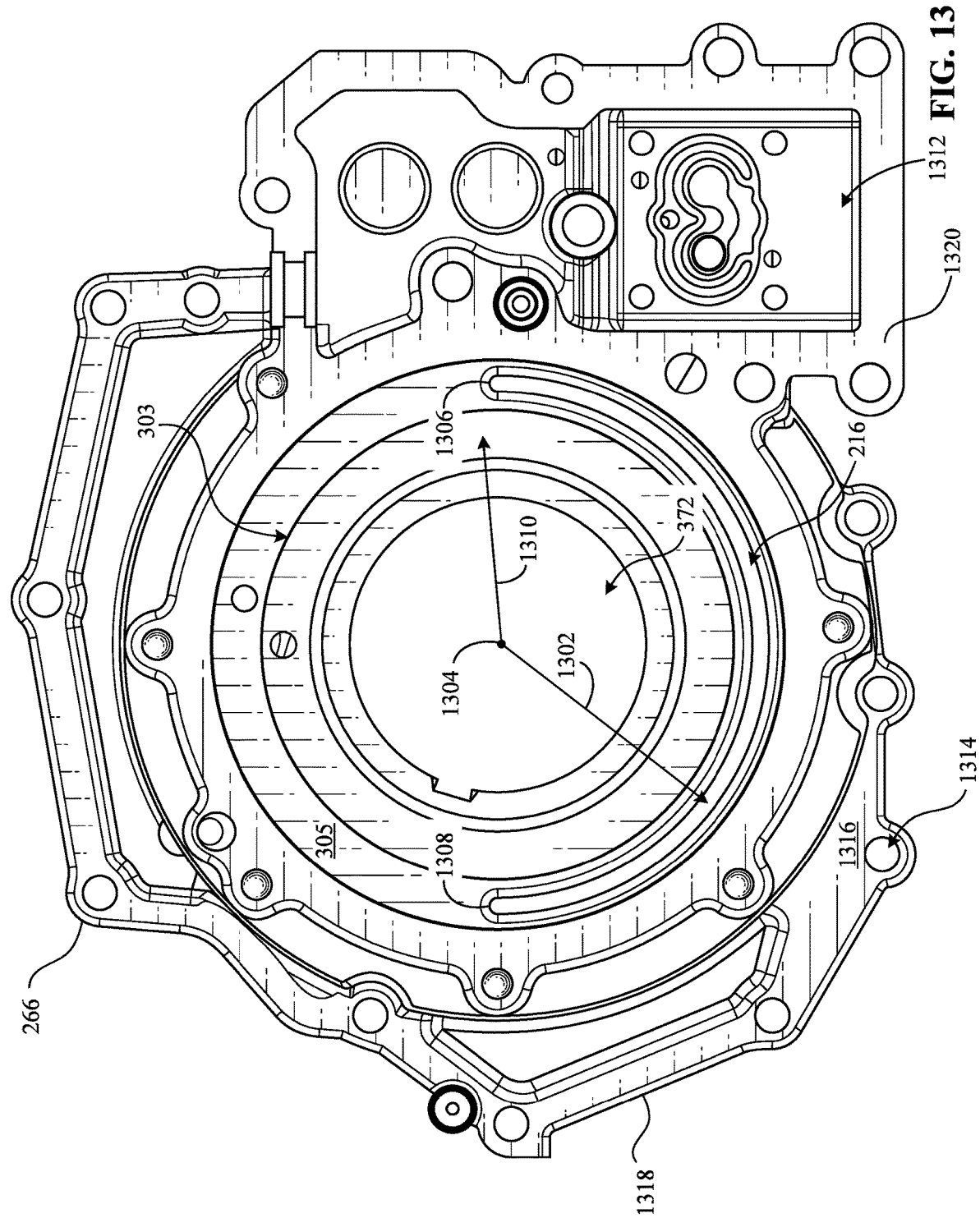
FIG. 13 is a view of an example housing portion in accordance with the teachings of this disclosure.

FIG. 13 is a view of the second housing portion 266 and shows an example configuration thereof. In some examples, the second housing portion 266 is sized, shaped, structured, and/or otherwise configured to implement the first configuration of the drive assembly 200 and/or the second configuration of the drive assembly 200. In particular, the second housing portion 266 includes one or more ports positioned thereon and/or extending therethrough to facilitate control of the first fluid 214 such as, for example, the first port 216. As shown in FIG. 13, the first port 216 is positioned on the wall 305 of the second housing portion 266 at or near a first example radius 1302 associated with the aperture 372. Further, in some examples, the first port 216 extends radially at or near the first radius 1302 relative to a second example axis 1304 associated with the aperture 372 across an example angle (e.g., about 180 degrees) from a third end 1306 of the first port 216 to a fourth end 1308 of the port 216 opposite the third end 1306. As such, the first port 216 may be semi-circular, as shown in FIG. 13.

In some examples, the second housing portion 266 is shaped and/or sized to at least partially form the chamber 304 associated with controlling the first piston 242. For example, the second housing portion 266 of FIG. 13 includes the first recessed area 303 positioned thereon, for example, at or near a second example radius 1310 associated with the aperture 372 that is smaller or less than the first radius 1302. However, in some examples, the first recessed area 303 is positioned on the second housing portion 266 differently. For example, the recessed area 303 may be positioned such that second radius 1310 is larger or greater than the first radius 1302. In any case, in such examples, the chamber 304 is formed when the body 302 of the first piston 242 is aligned to and/or disposed in the first recessed area 303.

Additionally, in some examples, the second housing portion 266 is shaped and/or sized to at least partially form one or more fluid reservoirs such as, for example, one or more of the first cavity 210, the second cavity 212, the first fluid reservoir 232, etc. For example, the second housing portion 266 of FIG. 13 includes a second example recessed area 1312 positioned thereon and/or extending at least partially into the second housing portion 266, which is to store and/or contain at least a portion of the first fluid 216. In some such examples, the first fluid reservoir 232 is formed via the second recessed area 1312 when the first and second housing portions 264, 266 are aligned to and/or positioned on each other.

In some examples, to facilitate coupling and/or securing the housing portions 264, 266, 268 together, the second housing portion 266 includes one or more other apertures 1314 for receiving respective fasteners. In such examples, the second housing portion 266 includes an example flange portion 1316 extending radially outward relative to the second axis 1304, which at least partially defines a peripheral surface 1318 of the second housing portion 266. In particular, the aperture(s) 1314 are positioned on and/or extend through the flange portion 1316. In some examples, the aperture(s) 1314 of FIG. 13 are radially distributed relative to the second axis 1304. Further, the flange portion 1316 is sized and/or shaped to receive the first housing portion 264 and the third housing portion 268. For example, as shown in FIG. 13, the flange portion 1316 has a first side 1320 that is configured to engage and/or otherwise receive the first housing portion 264.

Figure 14:
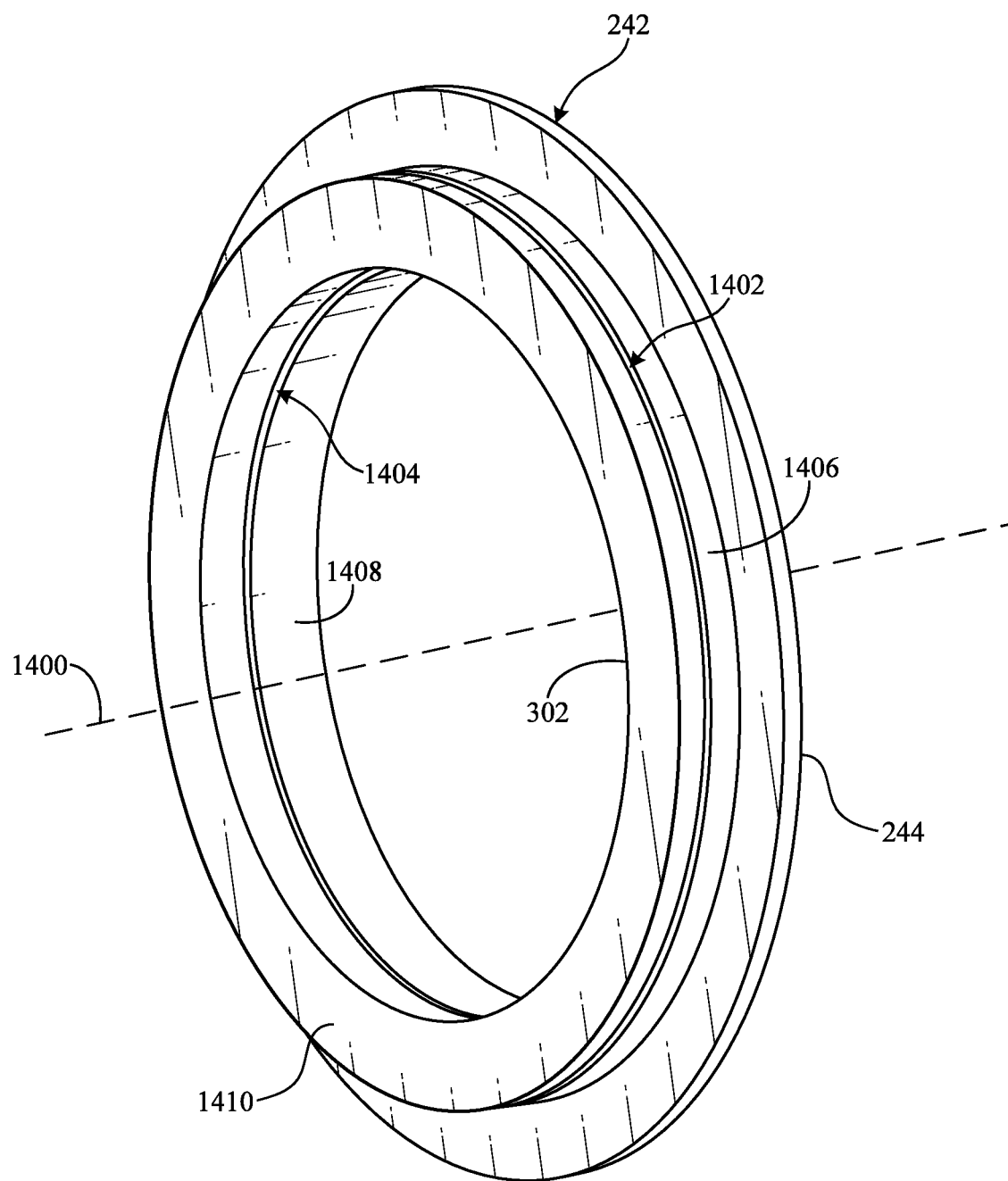
FIG. 14 is a view of an example piston in accordance with the teachings of this disclosure.

FIG. 14 is view of the first piston 242. As shown in FIG. 14, the fluid flow control portion 244 surrounds a third example axis 1400 associated with the first piston 242 and extends away from the body 302 radially outward relative to the third axis 1400. However, in some examples, the fluid flow control portion 244 is sized and/or shaped differently while still maintaining sufficient fluid control associated with the first port 216 (e.g., and/or one or more other ports). For example, the fluid flow control portion 244 may extend away from the body 302 radially inward relative to the third axis 1400. Further, although FIG. 14 depicts a single and/or a continuous fluid flow control portion 244, in some examples, the first piston 242 includes multiple fluid flow control portions positioned on the body 302 and radially distributed relative to the third axis 1400. Accordingly, in some examples where the second housing portion 266 includes multiple ports, each of the fluid flow control portions may be configured to control a flow of the first fluid 214 through a respective one of the ports.

In some examples, to facilitate coupling and/or securing the seal(s) 310, 312, the first piston 242 includes one or more example seal grooves (e.g., one or more annular grooves) 1402, 1404 positioned thereon, two of which are shown in this example (e.g., a first or outer seal groove 1402 and a second or inner seal groove 1404). In some examples, the first seal groove 1402 is positioned on an outer surface (e.g., a circumferential surface) 1406 of the body 302 and the second seal groove 1404 is positioned on an inner surface (e.g., a circumferential surface) 1408 of the body 302. In particular, the seal groove(s) 1402, 1404 of the first piston 242 are sized and/or shaped to receive respective ones of the seal(s) 310, 312.

In some examples, to facilitate operation of the clutch 204, the body 302 of FIG. 14 includes an example abutment surface (e.g., an annular shaped surface) 1410, for example, that is configured to engaged and/or otherwise receive a bearing (e.g., the bearing 326) and/or a plate (e.g., the apply plate 320). In some examples, the body 302 extends along a third example axis 1400 away from the fluid flow control portion 244 to define the abutment surface 1410. In particular, when the first piston moves 242, the abutment surface 1410 is sized and/or shaped to impart sufficient force(s) or load(s) on one or more of the bearing, the plate, and/or, more generally, at least a portion (e.g., one or more of the first clutch plates 224, 323 and/or one or more of the third clutch plates 820, 824) of the clutch 204, thereby commanding and/or generating torque for the clutch 204.

It will be appreciated that the piston apparatus for use with vehicle clutches disclosed in the foregoing description provide numerous advantages. Examples disclosed herein control a flow of a fluid associated with a clutch of a vehicle to reduce and/or eliminate fluid drag experienced by one or more clutch components when the clutch is disengaged. Further, disclosed examples properly and/or sufficiently lubricate the clutch components when the clutch begins to engage, which allows the clutch to better generate torque while reducing and/or eliminating part wear.

Although certain example apparatus and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A drive unit assembly for a vehicle, comprising:
   a housing defining a first cavity and a second cavity fluidly coupled together;
   a clutch in the first cavity; rotation of the clutch conveying a fluid from the first cavity to the second cavity;
   a port extending from the second cavity to the first cavity to receive the fluid; and
   a piston positioned in the first cavity proximate to the port and configured to operate the clutch, movement of the piston relative to the port controlling a flow of the fluid through the port from the second cavity to the first cavity by opening and closing the port.

2. The drive unit assembly of claim 1, wherein the port is on a wall of the housing interposed between the first cavity and the second cavity.

3. The drive unit assembly of claim 2, wherein the port is positioned at or near an end of the wall.

4. The drive unit assembly of claim 2, wherein the wall partially defines the first and second cavities.

5. The drive unit assembly of claim 2, wherein the piston includes a body and a flange that extends away from the body radially outward or inward relative to an axis of the body, the flange configured to engage and separate from a surface of the wall surrounding the port to open and close the port.

6. The drive unit assembly of claim 1, wherein the port includes a first end positioned in the first cavity and a second end positioned in the second cavity, and wherein, when the clutch is in a disengaged state for a time interval while the vehicle drives, a fluid pressure of the fluid near the second end is greater than a fluid pressure of the fluid near the first end.

7. The drive unit assembly of claim 1, wherein the clutch includes a twin clutch or a single clutch.

8. The drive unit assembly of claim 1, wherein the piston includes:
   a body forming a chamber with a wall of the housing and positioned near an apply plate, the apply plate extending away from the body through a drum of the clutch, a fluid pressure within the chamber to urge the body and the apply plate toward one or more clutch plates.

9. The drive unit assembly of claim 8, further including a spring operatively coupled to the piston to urge the piston away from the one or more clutch plates.

10. The drive unit assembly of claim 1, wherein the housing includes a first portion, a second portion, and a third portion that are coupled together, the second portion interposed between the first and third portions and having the port positioned thereon.

11. The drive unit assembly of claim 1, further comprising:
    a gear positioned in the second cavity and operatively interposed between the clutch and a first shaft of the vehicle to transfer engine torque therebetween, rotation of the gear conveys the fluid from the second cavity to the first cavity.

12. The drive unit assembly of claim 11, further including a fluid channel coupled to the housing and extending from the second cavity to the first cavity, the fluid channel to receive the fluid in response to the rotation of the gear and provide the fluid to the first cavity.

13. The drive unit assembly of claim 12, wherein the fluid channel includes at least one of a first outlet and a second outlet to direct the fluid out of the fluid channel, the first outlet positioned near first plates of the clutch or the second outlet positioned near second plates of the clutch different from the first plates.

14. The drive unit assembly of claim 13, wherein the fluid channel includes a fluid reservoir to store the fluid and interposed between an inlet of the fluid channel and the first and second outlets.

15. The drive unit assembly of claim 12, further including:
    a second shaft coupled to a housing of the clutch and the gear to receive the engine torque; and
    an axle coupled to one or more plates of the clutch and at least one road wheel of the vehicle to transfer torque therebetween, the axle extending through and spaced from the second shaft to partially form the fluid channel.

16. The drive unit assembly of claim 15, wherein the axle includes a groove positioned on and extending along an outer surface of the axle, the groove configured to carry the fluid at least partially across a length of the axle toward the clutch.

17. The drive unit assembly of claim 1, further comprising:
   a fluid channel coupled to the housing and extending from the first cavity to the second cavity, the fluid channel to receive the fluid in response to the rotation of the clutch and provide the fluid to the second cavity.

18. The drive unit assembly of claim 17, wherein the fluid channel includes a fluid reservoir interposed between an inlet and an outlet of the fluid channel to store the fluid.

19. The drive unit assembly of claim 18, wherein, when the clutch is in an engaged state, the fluid reservoir is configured to flow the fluid out therefrom at a flow rate that is less than a flow rate at which the fluid flows into the fluid reservoir.

* * * * *